USO11272462B2

(12) United States Patent
Kim et al.

(10) Patent No.: US 11,272,462 B2
(45) Date of Patent: Mar. 8, 2022

(54) METHOD AND APPARATUS FOR PERFORMING POWER HEADROOM REPORT IN WIRELESS COMMUNICATION SYSTEM

(71) Applicant: Samsung Electronics Co., Ltd., Suwon-si (KR)

(72) Inventors: Hyoungmin Kim, Suwon-si (KR); Namhoon Kim, Suwon-si (KR); Myunghwan Kim, Suwon-si (KR); Yongsung Roh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 64 days.

(21) Appl. No.: 16/934,462

(22) Filed: Jul. 21, 2020

(65) Prior Publication Data

US 2021/0037481 A1 Feb. 4, 2021

(30) Foreign Application Priority Data

Jul. 29, 2019 (KR) .................... 10-2019-0091600

(51) Int. Cl.
*H04W 52/36* (2009.01)
*H04W 72/12* (2009.01)

(52) U.S. Cl.
CPC ..... *H04W 52/365* (2013.01); *H04W 72/1226* (2013.01); *H04W 72/1268* (2013.01)

(58) Field of Classification Search
CPC ........... H04W 52/365; H04W 72/1226; H04W 72/1268; H04W 52/34; H04W 52/146; H04W 52/58; H04W 72/1205; H04W 88/06; H04W 72/0413; H04W 24/10; H04W 72/04; H04W 72/042; H04W 72/1284; H04W 88/02; H04W 88/08; (Continued)

(56) References Cited

U.S. PATENT DOCUMENTS 9,749,970 B2 8/2017 Vajapeyam et al.
2018/0063798 A1 3/2018 Yi et al.
2018/0115957 A1 4/2018 Lin et al.
(Continued)

OTHER PUBLICATIONS

3GPP, 5G; NR; Radio Resource Control (RRC); Protocol specification (3GPP TS 38.331 version 15.9.0 Release 15), Apr. 2020.
(Continued)

*Primary Examiner* — Shaima Q Aminzay
(74) *Attorney, Agent, or Firm* — Jefferson IP Law, LLP

(57) ABSTRACT

A communication method and a system for converging a 5th-Generation (5G) communication system for supporting higher data rates beyond a 4th-Generation (4G) system with a technology for Internet of Things (IoT) are provided. The disclosure may be applied to intelligent services based on the 5G communication technology and the IoT-related technology, such as smart home, smart building, smart city, smart car, connected car, health care, digital education, smart retail, security and safety services. The disclosure discloses a method for a terminal to generate all entry information of multiple power headroom reports (PHRs) as virtual PHs regardless of whether the terminal transmits an uplink to a serving cell in a wireless communication system supporting uplink carrier aggregation.

20 Claims, 14 Drawing Sheets

(58) Field of Classification Search
CPC ............. H04W 76/19; H04W 52/0206; H04W 72/1289
USPC ........................................................ 455/522
See application file for complete search history.

(56) References Cited

U.S. PATENT DOCUMENTS

| | | |
|---|---|---|
| 2018/0132197 A1 | 5/2018 | Lin et al. |
| 2018/0146440 A1 | 5/2018 | Hosseini et al. |
| 2018/0152901 A1 | 5/2018 | Hwang et al. |
| 2018/0262999 A1* | 9/2018 | Yi ..................... H04W 72/0413 |

OTHER PUBLICATIONS

3GPP, 5G; NR; Medium Access Control (MAC) protocol specification (3GPP TS 38.321 version 15.8.0 Release 15), Jan. 2020.

* cited by examiner

FIG. 8

| | | | | | | | |
|---|---|---|---|---|---|---|---|
| 0 | 0 | 0 | 0 | 0 | 0 | 0 | R |
| 0 | 0 | 0 | 0 | 0 | 1 | 1 | 1 |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |

800

...

| | | |
|---|---|---|
| P | V=0 | PH (Type 1, PCell) |
| R | R | $P_{CMAX,f,c}$ 8 |
| P | V=1 | PH (Type X, Serving Cell 1) |
| P | V=0 | PH (Type X, Serving Cell 2) |
| R | R | $P_{CMAX,f,c}$ 10 |

805 — P / 810 — V=0 / 820 — PH (Type 1, PCell)
815 — R / 825 — $P_{CMAX,f,c}$ 8
830, 835, 840

...

| | | |
|---|---|---|
| P | v | PH (Type X, Serving Cell n) |
| R | R | $P_{CMAX,f,c}$ m |

FIG. 9

|   |   |   |   |   |   |   |   |
|---|---|---|---|---|---|---|---|
| 0 | 0 | 0 | 0 | 0 | 0 | 0 | R |
| 0 | 0 | 0 | 0 | 0 | 1 | 1 | 1 |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |

...

| P | V=1 | PH (Type 1, PCell) |
|---|---|---|
| P | V=1 | PH (Type X, Serving Cell 1) |
| P | V=1 | PH (Type X, Serving Cell 2) |

...

| P | V | PH (Type X, Serving Cell n) |
|---|---|---|
| R | R | $P_{CMAX,f,c}$ m |

METHOD AND APPARATUS FOR PERFORMING POWER HEADROOM REPORT IN WIRELESS COMMUNICATION SYSTEM

CROSS-REFERENCE TO RELATED APPLICATION(S)

This application is based on and claims priority under 35 U.S.C. § 119(a) of a Korean patent application number 10-2019-0091600, filed on Jul. 29, 2019, in the Korean Intellectual Property Office, the disclosure of which is incorporated by reference herein in its entirety.

BACKGROUND

1. Field

The disclosure relates to a method and an apparatus for performing a power headroom report (PHR) in a wireless communication system. More particularly, the disclosure relates to a method and an apparatus for a terminal to transmit all entry information of multiple power headroom reports (PHRs) as virtual PHs in a wireless communication system.

2. Description of Related Art

To meet the demand for wireless data traffic having increased since deployment of 4th generation (4G) communication systems, efforts have been made to develop an improved $5^{th}$ generation (5G) or pre-5G communication system. Therefore, the 5G or pre-5G communication system is also called a 'Beyond 4G Network' or a 'Post long term evolution (LTE) System'. The 5G communication system is considered to be implemented in higher frequency (millimeter (mm) Wave) bands, e.g., 60 gigahertz (GHz) bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Quadrature Amplitude Modulation (QAM) modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Meanwhile, the Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (cloud RAN) as the above-described big data processing technology may also be considered to be as an example of convergence between the 5G technology and the IoT technology.

In an LTE system or the next generation mobile communication system, a transmission power amount available to a terminal is called power headroom (PH), and the PH is defined as a difference between the maximum transmission power PCMAX and a terminal transmission power being currently used. If a specific condition is satisfied, the terminal reports the PH to a base station, and this is called a power headroom report (PHR).

In particular, in case of supporting double connectivity (DC) between multiple radio access technologies (RATs) or uplink (UL) carrier aggregation (CA), in order for a base station to optimize an uplink service area, it is necessary to configure scheduling with multiple power headroom reports (PHRs), and in case of using the multiple PHRs, it is necessary to exchange scheduling information between base stations depending on whether an actual data channel or a control channel is transmitted for a power control of the terminal.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an apparatus for transmitting and receiving all entry information of multiple PHRs corresponding to a plurality of serving cells by generating the all entry information as virtual PHs in a wireless communication system supporting multiple RAT DC or uplink CA.

Another aspect of the disclosure is to provide a method for multiple PHR reports can perform effective scheduling, such as uplink power control and allocated resource size adjustment, without exchanging scheduling information between base stations by transmitting virtual multiple PHR media access control (MAC) control element (CE) formats in which all entry information of multiple PHRs is generated as virtual PHs regardless of actual transmission/non-transmission of a terminal.

Another aspect of the disclosure is to provide a method and an apparatus for transmitting all entry information of multiple power headroom reports (PHRs) as virtual PHs regardless of actual transmission/non-transmission of a terminal in a wireless communication system.

Additional aspects will be set forth in part in the description which follows and, in part, will be apparent from the description, or may be learned by practice of the presented embodiments.

In accordance with an aspect of the disclosure, a method by a terminal for a multi power headroom report (PHR) in a wireless communication system supporting uplink carrier aggregation is provided. The method includes receiving, from a base station, PHR configuration information including multi PHR type information, determining an indicator indicating whether a predefined transmission format is used in case of generating power headroom (PH) information on each of a plurality of serving cells based on the multi PHR type information, generating multi PH information on the plurality of serving cells based on the indicator, and transmitting the multi PH information to the base station, wherein the multi PHR type information is information indicating a first type multi MAC CE format or a second type multi MAC CE format.

In accordance with another aspect of the disclosure, a method by a base station for receiving multi power headroom (PH) information in a wireless communication system supporting uplink carrier aggregation is provided. The method includes transmitting, to a terminal, PHR configuration information including multi PHR type information, receiving, from the terminal, the multi PH information corresponding to a plurality of serving cells, and performing uplink scheduling based on the received multi PH information, wherein the multi PHR type information is information indicating a first type multi MAC CE format or a second type multi MAC CE format, an indicator indicating whether a predefined transmission format is used is determined in case that the terminal generates the power headroom (PH) information on each of the plurality of serving cells based on the multi PHR type information, and the multi PH information is generated based on the determined indicator.

In accordance with another aspect of the disclosure, a multi power headroom report (PHR) device in a wireless communication system supporting uplink carrier aggregation is provided. The PHR device includes a transceiver configured to communicate with a base station, and a controller connected to the transceiver, wherein the controller is configured to control the transceiver to receive, from the base station, PHR configuration information including multi PHR type information, determine an indicator indicating whether a predefined transmission format is used in case of generating power headroom (PH) information on each of a plurality of serving cells based on the multi PHR type information, generate multi PH information on the plurality of serving cells based on the indicator, and control the transceiver to transmit the multi PH information to the base station, and wherein the multi PHR type information is information indicating a first type multi MAC CE format or a second type multi MAC CE format.

In accordance with another aspect of the disclosure, an apparatus for receiving multi power headroom (PH) information in a wireless communication system supporting uplink carrier aggregation is provided. The apparatus includes a transceiver configured to communicate with a terminal, and a controller connected to the transceiver, wherein the controller is configured to control the transceiver to transmit, to a terminal, PHR configuration information including multi PHR type information and to receive, from the terminal, the multi PH information corresponding to a plurality of serving cells, and control to perform uplink scheduling based on the received multi PH information, and wherein the multi PHR type information is information indicating a first type multi MAC CE format or a second type multi MAC CE format, an indicator indicating whether a predefined transmission format is used is determined in case that the terminal generates the power headroom (PH) information on each of the plurality of serving cells based on the multi PHR type information, and the multi PH information is generated based on the determined indicator.

The method for the virtual multiple PHRs according to the disclosure does not require the scheduling information exchange between the base stations and thus can implement the scheduling operation including the terminal power control and resource allocation more easily by generating all entry information of multiple PHRs as virtual PHs and transmitting the virtual type multi PHR information regardless of the actual transmission/non-transmission of the terminal.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features and advantages of certain embodiments of the disclosure will be more apparent from the following description taken in conjunction with the accompanying drawings, in which:

FIG. 8 is a diagram illustrating a first type multi PHR MAC CE format according to an embodiment of the disclosure;

FIG. 9 is a diagram illustrating a second type multi PHR MAC CE format according to an embodiment of the disclosure;

Throughout the drawings, it should be noted that like reference numbers are used to depict the same or similar elements, features, and structures.

DETAILED DESCRIPTION

Figure 1:
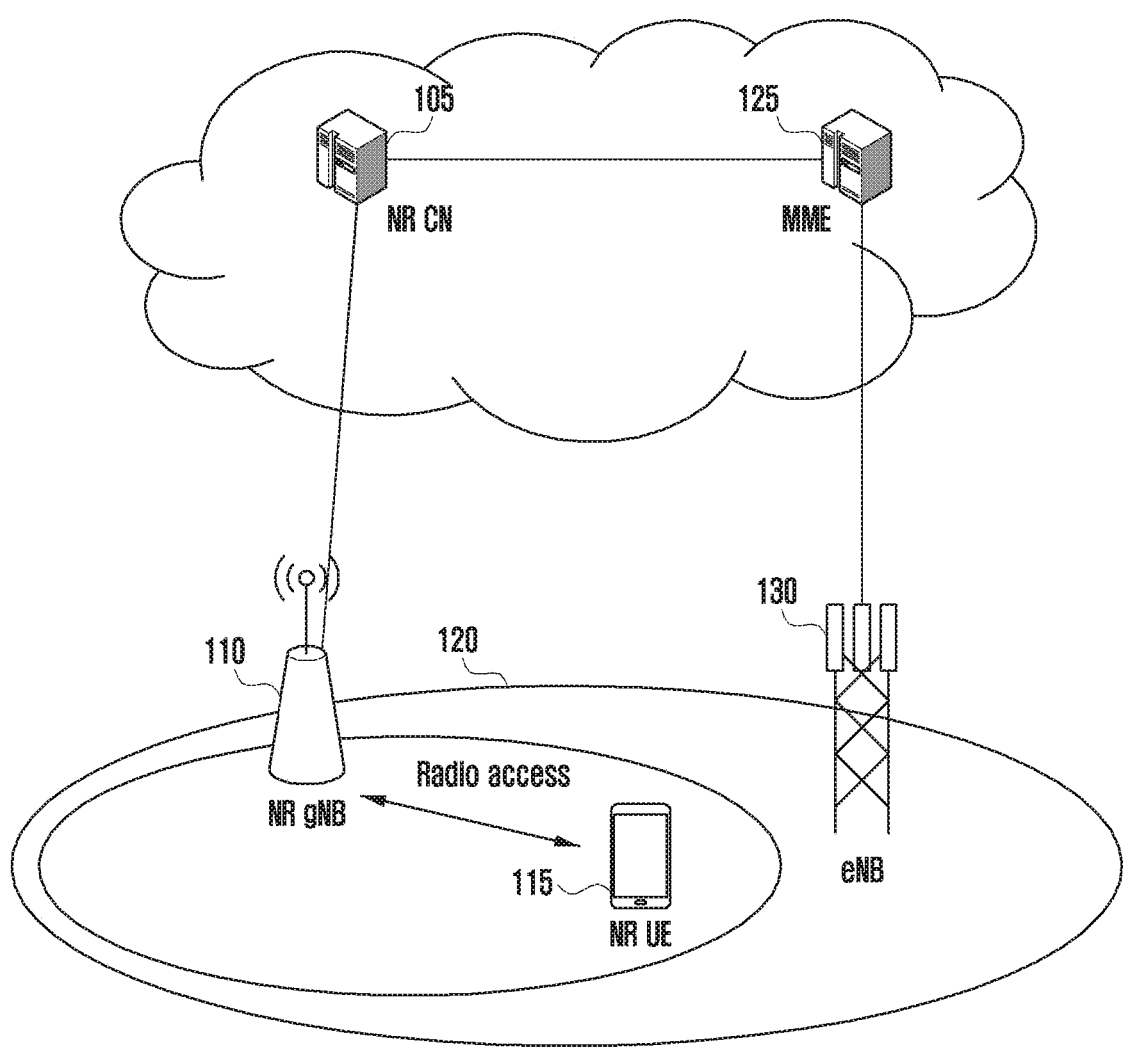
FIG. 1 is a diagram illustrating a structure of a next generation mobile communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, an operation principle of the disclosure is described in detail with reference to the accompanying drawings. In describing the disclosure, a detailed description of a related known function or configuration will be omitted if it is deemed to make the gist of the disclosure unnecessarily vague. Furthermore, terms to be described hereunder have been defined by taking into consideration functions in the disclosure, and may be different depending on a user, an operator's intention or practice. Accordingly, each term should be defined based on contents over the entire specification.

Hereinafter, in describing the disclosure, a detailed description of a related known function or configuration will be omitted if it is deemed to make the gist of the disclosure unnecessarily vague. Hereinafter, embodiments of the disclosure will be described with reference to the accompanying drawings.

First, terms being used in the description will be defined.

Specific terms being used in the following description are provided to help understanding of the disclosure, and the usage of such specific terms may be changed to other types within a range that does not deviate from the technical idea of the disclosure.

In the following description, a term to identify an access node, a term to denote network entities, a term to denote messages, a term to denote an interface between network entities, and a term to denote a variety of types of identity information have been exemplified for convenience in explanation. Accordingly, the disclosure is not limited to the following terms, and other terms to denote targets having equivalent technical meanings may be used.

For convenience in explanation, in the disclosure, terms and names defined in the Long Term Evolution (LTE) and New Radio (NR) standards of the 3rd Generation Partnership Project (hereinafter, referred to as "3GPP") are used. However, the disclosure is not restricted by the terms and names, and it may be equally applied to systems complying with other standards.

In the description, a base station means a terminal node of a network, which directly performs communication with a terminal. According to circumstances, a specific operation described to be performed by the base station may be performed by an upper node of the base station. That is, in the network composed of a plurality of network nodes including the base station, it is apparent that various operations being performed for communication with the terminal may be performed by the base station or other network nodes excluding the base station. The base station (BS) may be replaced by terms "fixed station, Node B, evolved-NodeB (eNB), base transceiver system (BTS), and access point (AP)." Further, the terminal may be fixed or may have mobility, and may be replaced by terms "user equipment (UE), mobile station (MS), user terminal (UT), mobile subscriber station (MSS), subscriber station (SS), advanced mobile station (AMS), wireless terminal (WT), machine-type communication (MTC) device, machine-to-machine (M2M) device, and device-to-device (D2D) device."

Hereinafter, a downlink (DL) means communication from a base station to a terminal, and an uplink (UL) means communication from a terminal to a base station. In the downlink a transmitter may be a part of the base station, and a receiver may be a part of the terminal. In the uplink, a transmitter may be a part of the terminal, and a receiver may be a part of the base station.

Specific terms being used in the following description are provided to help understanding of the disclosure, and the usage of such specific terms may be changed to other types within a range that does not deviate from the technical idea of the disclosure.

Embodiments of the disclosure may be supported by standard documents disclosed in at least one of IEEE 802, 3GPP, and 3GPP2, which are radio access systems. That is, in embodiments of the disclosure, operations or parts, which have not been explained to clearly reveal the technical ideas of the disclosure, may be supported by the above-described documents. Further, all terms disclosed in the description may be explained by the above-described standard document.

In order to clarify the explanation, a 3GPP 5th generation (5G) system will be mainly described, but the technical features of the disclosure are not limited thereto.

FIG. 1 is a diagram illustrating the structure of a next generation mobile communication system according to an embodiment of the disclosure.

Referring to FIG. 1, as illustrated, a radio access network of a next generation mobile communication system (hereinafter, NR or 5G) is composed of a new radio node B (hereinafter, NR gNB or NR base station) 110 and a new radio core network (NR CN) 105. A new radio user equipment (hereinafter, NR UE or terminal) 115 accesses an external network through the NR gNB 110 and the NR CN 105.

Referring to FIG. 1, the NR gNB 110 corresponds to an evolved node B (eNB) of the existing LTE system. The NR gNB is connected to the NR UE 115 on a radio channel, and thus it can provide a more superior service than the service of the existing node B. Because all user traffics are serviced on shared channels in the next generation mobile communication system, a device that performs scheduling through consolidation of status information, such as a buffer state, an available transmission power state, and a channel state of each UE, is necessary, and the NR gNB 110 takes charge of this. One NR gNB generally controls a plurality of cells. At present, in order to implement ultrahigh-speed data transmission as compared with the LTE, the NR gNB may have the existing maximum bandwidth or more, and a beamforming technology may be additionally grafted in consideration of orthogonal frequency division multiplexing (hereinafter referred to as "OFDM") as a radio access technology. Further, an adaptive modulation & coding (hereinafter referred to as "AMC") scheme determining a modulation scheme and a channel coding rate is applied to match the channel state of the UE. The NR CN 105 performs functions of mobility support, bearer configuration, and QoS configuration. The NR CN is a device taking charge of not only terminal mobility management but also various kinds of control functions, and is connected to a plurality of base stations.

Further, the next generation mobile communication system may also interlock with the existing LTE system, and the NR CN is connected to an MME 125 through a network interface. The MME is connected to an eNB 130 that is the existing base station. That is, the terminal supporting LTE-NR dual connectivity may transmit and receive data while maintaining a connection to not only the gNB but also the eNB. This will be described in detail with reference to FIG. 4.

Figure 2:
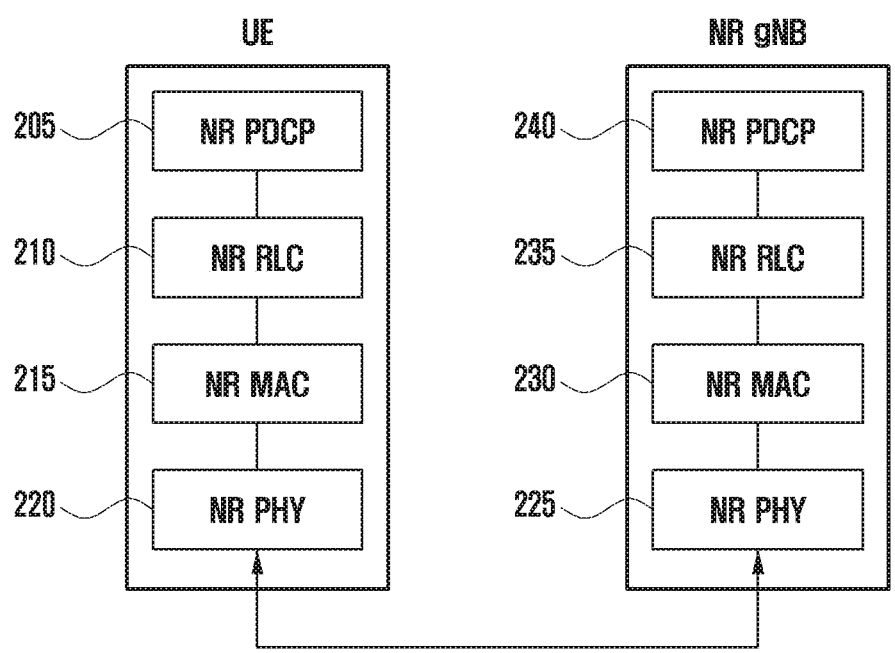
FIG. 2 is a diagram illustrating a radio protocol structure of a next generation mobile communication system according to an embodiment of the disclosure.

FIG. 2 is a diagram illustrating a radio protocol structure of a next generation mobile communication system according to an embodiment of the disclosure.

Referring to FIG. 2, in a terminal or an NR base station, a radio protocol of a next generation mobile communication system is composed of a new radio packet data convergence protocol (NR PDCP) 205 or 240, a new radio radio link control (NR RLC) 210 or 235, and a new radio media access control (NR MAC) 215 or 230. The main functions of the NR PDCP 205 or 240 may include parts of the following functions.

Header compression and decompression: robust header compression (ROHC) only
Transfer of user data
In-sequence delivery of upper layer protocol data units (PDUs)
PDCP PDU reordering for reception
Duplicate detection of lower layer service data units (SDUs)
Retransmission of PDCP SDUs
Ciphering and deciphering
Timer-based SDU discard in an uplink As described above, the reordering of the NR PDCP device may mean a function of reordering the PDCP PDUs received from the lower layer in order based on a PDCP sequence number (SN), and may include a function of transferring data to the upper layer in the order of reordering. Further, the reordering function of the NR PDCP device may include a function of recording lost PDCP PDUs through the reordering, a function of reporting the state of the lost PDCP PDUs to a transmission side, and a function of requesting retransmission of the lost PDCP PDUs.

The main functions of the NR RLC 210 or 235 may include parts of the following functions.

Transfer of upper layer PDUs
In-sequence delivery of upper layer PDUs
Out-of-sequence delivery of upper layer PDUs
Error correction through automatic repeat request (ARQ)
Concatenation, segmentation, and reassembly of RLC SDUs
Re-segmentation of RLC data PDUs
Reordering of RLC data PDUs
Duplicate detection
Protocol error detection
RLC SDU discard
RLC reestablishment As described above, the in-sequence delivery of the NR RLC device may mean in-sequence delivery of RLC SDUs received from a lower layer to an upper layer, and in case that one original RLC SDU is segmented into several RLC SDUs to be received, the in-sequence delivery of the NR RLC device may include reassembly and delivery of the RLC SDUs. Further, the in-sequence delivery of the NR RLC device may include reordering of the received RLC PDUs based on an RLC sequence number (SN) or a PDCP sequence number (SN), and recording of lost RLC PDUs through reordering. Further, the in-sequence delivery of the NR RLC device may include status report for the lost RLC PDUs to a transmission side, retransmission request for the lost RLC PDUs, and in-sequence delivery of only RLC SDUs just before the lost RLC SDU to an upper layer if there is the lost RLC SDU. Further, the in-sequence delivery of the NR RLC device may include in-sequence delivery of all RLC SDUs received before a specific timer starts its operation to an upper layer if the timer has expired although there is the lost RLC SDU, and in-sequence delivery of all RLC SDUs received up to now to an upper layer if the specific timer has expired although there is the lost RLC SDU. Further, the NR RLC device may process the RLC PDUs in the order of their receptions (regardless of the order of sequence numbers, that is, in the order of their arrivals), and may transfer the processed RLC PDUs to the PDCP device in an out-of-sequence delivery manner. In case of segments, the NR RLC device may receive the segments stored in a buffer or to be received later, reconfigure them as one complete RLC PDU, and then process and transfer the reconfigured RLC PDU to the PDCP device. The NR RLC layer may not include a concatenation function, and the function may be performed by an NR MAC layer or may be replaced by a multiplexing function of the NR MAC layer.

As described above, the out-of-sequence delivery of the NR RLC device may mean a function of transferring the RLC SDUs received from the lower layer directly to the upper layer regardless of their orders. If one original RLC SDU is segmented into several RLC SDUs to be received, the out-of-sequence delivery of the NR RLC device may include reassembly and delivery of the RLC SDUs, and functions of storing and ordering RLC SNs or PDCP SNs of the received RLC PDUs and recording of the lost RLC PDUs.

The NR MAC 215 or 230 may be connected to several NR RLC layer devices configured in one terminal, and the main functions of the NR MAC may include parts of the following functions.

Mapping between logical channels and transport channels
Multiplexing/demultiplexing of MAC SDUs
Scheduling information reporting
Error correction through hybrid ARQ (HARQ)
Priority handling between logical channels of one UE
Priority handling between UEs by means of dynamic scheduling
multimedia broadcast multicast services (MBMS) service identification
Transport format selection
Padding The new radio physical (NR PHY) layer 220 or 225 may perform channel coding and modulation of upper layer data to produce and transmit OFDM symbols on a radio channel, or may perform demodulation and channel decoding of the OFDM symbols received on the radio channel to transfer the demodulated and channel-decoded OFDM symbols to the upper layer.

Meanwhile, the PHY layer may be composed of one or a plurality of frequencies/carriers, and a technology enabling one base station to simultaneously configure and use a plurality of frequencies is called carrier aggregation (hereinafter referred to as "CA"). The CA technology can dramatically increase the transmission amount as high as the number of secondary carriers by additionally using one primary carrier and one or a plurality of secondary carriers rather than using only one carrier for communication between a terminal (or user equipment (UE) and a base station (E-UTRAN NodeB (eNB)). Meanwhile, in LTE and NR systems, a cell that uses a primary carrier in the base station is called a primary cell (PCell), and a cell that uses a secondary carrier is called a secondary cell (SCell). A technology to extend the above-described CA function to two base stations is called dual connectivity (hereinafter referred to as "DC"). In the DC technology, a terminal simultaneously connects to and uses a master base station (master E-UTRAN NodeB (hereinafter referred to as "MeNB")) and a secondary base station (secondary E-UTRAN NodeB (hereinafter referred to as "SeNB")), and cells belonging to the master base station are called a master cell group (hereinafter referred to as "MCG") and cells belonging to the secondary base station are called a secondary cell group (hereinafter referred to as "SCG"). A representative cell exists in each cell group, and a representative cell of the master cell group is called a primary cell (hereinafter referred to as "PCell") and a representative cell of the secondary cell group is called a primary secondary cell (hereinafter referred to as "PSCell"). In case of using the above-described NR, the terminal can simultaneously use the LTE and the NR by using the LTE technology for the MCG and using the NR for the SCG.

Meanwhile, in the LTE and NR systems, the terminal performs a power headroom report (PHR) with respect to the base station in accordance with a specific condition. The power headroom information means a difference between the maximum transmission power configured to the terminal and the transmission power estimated by the terminal. The transmission power estimated by the terminal is calculated based on a value being used in case that the terminal actually transmits an uplink (in this case, the calculated value is referred to as a "real value"), but is calculated based on a specific Equation defined in the standard specification in case that the terminal does not actually transmit the uplink (in this case, the calculated value is referred to as a "virtual value"). By reporting the power headroom information, the base station can determine how much the maximum transmittable power value of the terminal is. Meanwhile, in the above-described CA situation, the power headroom information is transmitted for each secondary carrier.

Figure 3:
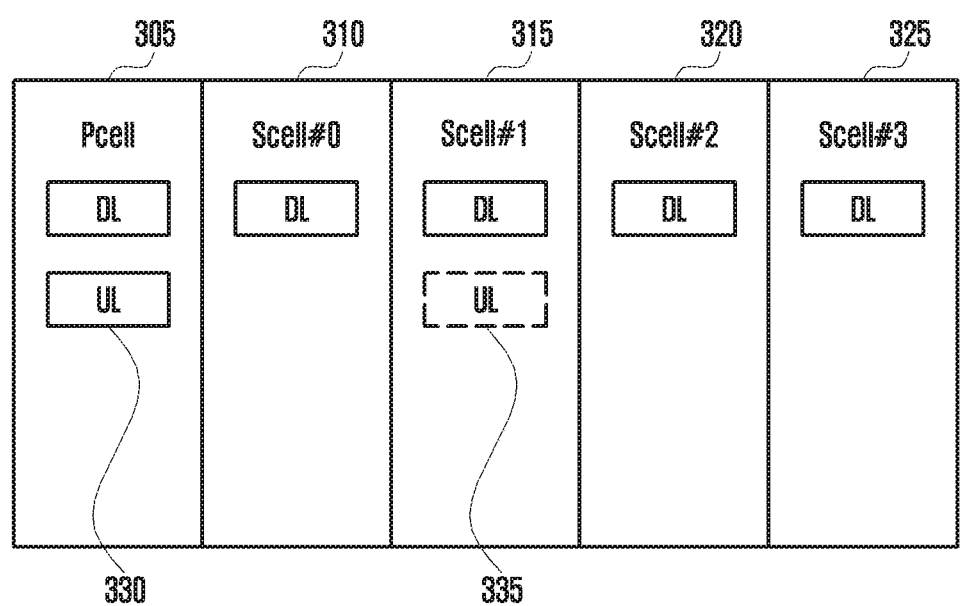
FIG. 3 is a diagram illustrating a concept of carrier aggregation in a terminal according to an embodiment of the disclosure.

FIG. 3 is a diagram illustrating the concept of a carrier aggregation system in a terminal according to an embodiment of the disclosure.

In a single carrier system, only one carrier is supported for a terminal on an uplink and a downlink. A carrier may have various bandwidths, but the terminal is allocated with one carrier.

Referring to FIG. 3, in contrast, in a carrier aggregation (CA) system, a plurality of component carriers may be allocated to a terminal. A component carrier (CC) means a carrier being used in the carrier aggregation system, and may be abbreviated as a carrier.

The carrier aggregation system may be divided into a contiguous carrier aggregation system in which aggregated carriers are contiguous and a non-contiguous carrier aggregation system in which the aggregated carriers are spaced apart from each other. Hereinafter, it should be understood that the simply called carrier aggregation system includes both cases where the component carriers are contiguous and non-contiguous.

The system frequency band of a wireless communication system is divided into a plurality of carrier-frequencies. Here, the carrier frequency means a center frequency of a cell. Hereinafter, a cell may mean a downlink frequency resource and an uplink frequency resource. Further, the cell may mean a combination of a downlink frequency resource and an optional uplink frequency resource. In general, in case that the carrier aggregation (CA) is not considered, a pair of uplink and downlink frequency resources always exists in one cell.

In order to perform packet data transmission and reception through a specific cell, the terminal should first complete configuration with respect to the specific cell. Here, the configuration means a state where reception of system information required for the data transmission and reception with respect to the corresponding cell is completed. For example, the configuration may include an overall process of receiving common physical layer parameters necessary for the data transmission and reception, media access control (MAC) layer parameters, or parameters necessary for a specific operation in a radio resource control (RRC) layer. The configuration-completed cell corresponds to a state where immediate packet transmission and reception becomes possible if only information indicating that packet data can be transmitted is received.

A cell in a configuration completed state may exist in an activation or deactivation state. Here, the activation means that data transmission or reception is being performed or is in a ready state. The terminal may monitor or receive a control channel (PDCCH, physical downlink control channel) and a data channel (PDSCH, physical downlink shared channel) of the activated cell in order to identify a resource (that may be a frequency or time) allocated to the terminal itself.

The deactivation means that it is not possible to transmit or receive traffic data, but measurement or minimum information transmission/reception is possible. The terminal can receive system information (SI) necessary for packet reception from a deactivated cell. In contrast, the terminal does not monitor or receive a control channel (PDCCH) and a data channel (PDSCH) of the deactivated cell in order to identify a resource (that may be a frequency or time) allocated to the terminal itself.

That is, as described above, the carrier aggregation (CA) exists. The carrier aggregation is a technology capable of configuring a broadband by aggregating a plurality of component carriers (CC) having a narrowband. The component carrier includes a downlink component carrier and an uplink component carrier. A cell may be defined as a pair of a downlink component carrier and an uplink component carrier or a downlink component carrier, and in this case, it may be understood that the carrier aggregation is aggregation of a plurality of cells.

The carrier aggregation includes a primary cell in which the terminal establishes initial connection/reconnection processes with the base station, and a secondary cell being added in addition to the primary cell.

The cell may be divided into a primary cell (Pcell) 305, a secondary cell (Scell) (e.g., Scells 310, 315, 320, and 325), and a serving cell.

The primary cell means a cell operating at a primary frequency, and means a cell in which the terminal performs an initial connection establishment procedure or a connection reestablishment procedure with the base station, or a cell indicated as the primary cell in a handover procedure.

The secondary cell means a cell operating at a secondary frequency, and the secondary cell is configured once the RRC connection is established and is used to provide an additional radio resource.

In case of a terminal of which the carrier aggregation is not configured or the carrier aggregation is unable to be provided, the serving cell is composed of a primary cell. In case that the carrier aggregation is configured, the term "serving cell" indicates a cell configured to the terminal, and a plurality of serving cells may be provided. One serving cell may be composed of one downlink component carrier or a pair of {a downlink component carrier and an uplink component carrier}. The plurality of serving cells may constitute a set of one or more of a primary cell and all secondary cells.

A primary component carrier (PCC) means a component carrier (CC) corresponding to a primary cell. The PCC is a CC on which the terminal initially makes a connection (or RRC connection) with the base station among various CCs. The PCC is a special CC which takes charge of a connection (or RRC connection) for signaling for a plurality of CCs and manages UE context that is connection information related to the terminal. Further, the PCC exists always in an activation state in case that it makes a connection with the terminal and is in an RRC connected mode. A downlink component carrier corresponding to a primary cell is called a downlink primary component carrier (DL PCC), and an uplink component carrier corresponding to a primary cell is called an uplink primary component carrier (UL PCC) 330.

A secondary component carrier (SCC) means a CC corresponding to a secondary cell. That is, the SCC is a CC allocated to the terminal in addition to the PCC, and the SCC is an extended carrier for an additional resource allocation to the terminal in addition to the PCC, and may be divided into an activation state or a deactivation state. A downlink component carrier corresponding to a secondary cell is called a DL secondary CC (DL SCC), and an uplink component carrier corresponding to a secondary cell is called an UL secondary CC (UL SCC) 335.

The primary cell and the secondary cell have the following features.

First, the primary cell is used to transmit a physical uplink control channel (PUCCH). Second, the primary cell is always activated, whereas the secondary cell is a carrier that is activated/deactivated in accordance with a specific condition. Third, in case that the primary cell experiences a radio link failure (hereinafter, RLF), RRC reconnection is triggered. Fourth, the primary cell may be changed by a security key change or handover procedure accompanied by a random access channel (RACH) procedure. Fifth, non-access stratum (NAS) information is received through the primary cell. Sixth, in case of an FDD system, the primary cell is always composed of a pair of a DL PCC and an UL PCC 330. Seventh, a different component carrier (CC) may be configured as the primary cell for each terminal Eighth, the primary cell may be replaced only through a handover or cell selection/cell reselection procedure. In adding a new secondary cell, the RRC signaling may be used to transmit system information of a dedicated secondary cell.

As for a component carrier constituting a serving cell, a downlink component carrier may constitute one serving cell, or a downlink component carrier and an uplink component carrier may constitute one serving cell through a connection configuration. However, only one uplink component carrier is unable to constitute the serving cell.

The activation/deactivation of the component carrier is equal to the concept of the activation/deactivation of the serving cell. For example, if it is assumed that serving cell 1 is composed of DL CC1, the activation of the serving cell 1 means the activation of the DL CC1. If it is assumed that serving cell 2 is composed of DL CC2 and UL CC2 through a connection configuration thereof, the activation of the serving cell 2 means the activation of the DL CC2 and the UL CC2. Through such a meaning, each of respective component carriers may correspond to the serving cell.

The number of component carriers aggregated between a downlink and an uplink may be differently configured. A case where the number of downlink CCs is equal to the number of uplink CCs corresponds to symmetric aggregation, and a case where the number of downlink CCs is different from the number of uplink CCs corresponds to asymmetric aggregation. Further, sizes (i.e., bandwidths) of the CCs may differ from each other. For example, in case that 5 CCs are used fir 70 MHz band configuration, they may be configured as 5 MHz CC (carrier #0)+20 MHz CC (carrier #1)+20 MHz CC (carrier #2)+20 MHz CC (carrier #3)+5 MHz CC (carrier #4).

As described above, in contrast with the single carrier system, the carrier aggregation system can support a plurality of component carriers (CCs), that is, a plurality of serving cells.

Referring to FIG. 3, for a series of specific purposes, a primary CC (PCC) (or primary cell (P-cell) or an anchor CC (or anchor cell) may be configured among DL and UL component carriers constituted or configured for a certain terminal. As an example, the DL PCC (or DL P-cell) may be configured for the purpose of transmission of constitution or reconstitution information on always RRC connection configuration, and as another example, the UL PCC (or UL P-cell) 330 may be configured as the UL CC to transmit a PUCCH for transmitting uplink control information (UCI) that a certain terminal should transmit to the uplink.

A specific one of the DL PCC (P-cell) and the UL PCC (P-cell) 330 is basically configured for each terminal. Further, in a situation where a very large number of CCs are configured to the terminal or the CCs can be configured from a plurality of base stations, one or a plurality of DL PCCs (P-cells) and/or UL PCCs (P-cell) 330 may be configured from one or more base stations to a certain terminal. First, as a linkage between the DL PCC (P-cell) and the UL PCC (P-cell) 330, a method may be considered, in which a base station can UE-specifically configure the linkage optionally.

Figure 4:
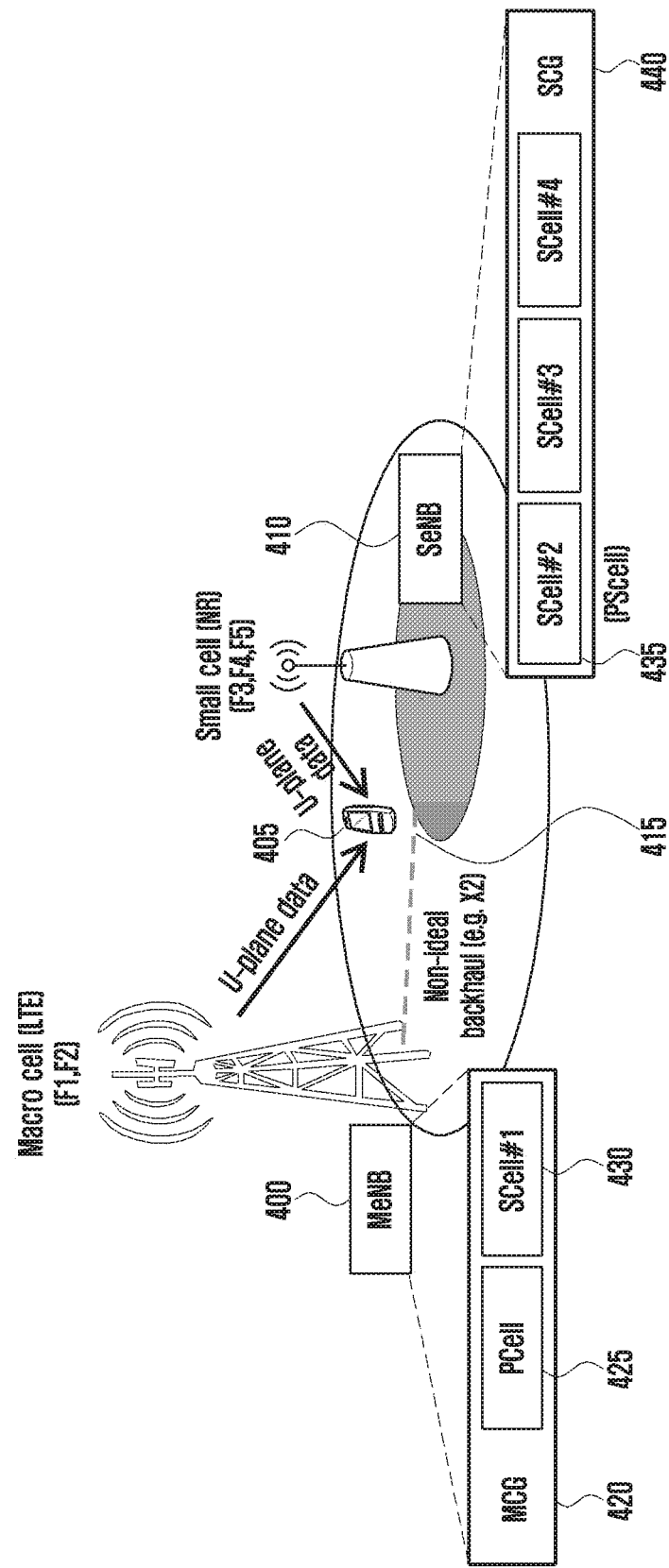
FIG. 4 is a diagram explaining a concept of multiple connections in an LTE and an NR according to an embodiment of the disclosure.

FIG. 4 is a diagram explaining the concept of multiple connections in an LTE and an NR according to an embodiment of the disclosure.

Referring to FIG. 4, using dual connectivity (DC) technology, a terminal can simultaneously connect to and use two base stations, and the drawing illustrates a case where a terminal 405 simultaneously connects to a macro base station 400 using an LTE technology and a small cell base station 410 using an NR technology, and performs data transmission/reception with the two base stations. This is called E-UTRAN-NR dual connectivity (EN-DC). The macro base station is called a master E-UTRAN NodeB (MeNB), and the small cell base station is called a secondary 5G NodeB (SgNB). Several small cells may exist in a service area of the MeNB, and the MeNB is connected to the SgNBs through a wired backhaul network 415. A set of serving cells provided from the MeNB is called a master cell group (MCG) 420, and one serving cell in the MCG should become a primary cell (PCell) 425 having all functions having been performed by the existing cell, such as connection establishment, connection reestablishment, and handover. Further, In the PCell, an uplink control channel includes a PUCCH. A serving cell excluding the PCell is called a secondary cell (SCell) 430. FIG. 4 illustrates a scenario in which the MeNB provides one SCell, and the SgNB provides three S Cells 435. A set of serving cells provided by the SgNB is called a secondary cell group (SCG) 440. In case that the terminal transmits and receives data to and from the two base stations, the MeNB gives orders to the SgNB to add, change, or remove the serving cells provided by the SgNB. In order to give such orders, the MeNB may configure the terminal to measure the serving cells and neighboring cells. In accordance with configuration information, the terminal should report the measurement result to the MeNB. In order for the SgNB to efficiently transmit/receive data with respect to the terminal, a serving cell that plays a similar role to the role of the PCell of the MCG is necessary, and in the disclosure, this serving cell is called a primary SCell (PSCell). The PSCell is determined as one of serving cells of the SCG, and is featured to include the PUCCH that is the uplink control channel. The PUCCH is used for the terminal to transfer HARQ ACK/NACK information, channel status information (CSI), and a scheduling request (SR) to the base station.

Figure 5:
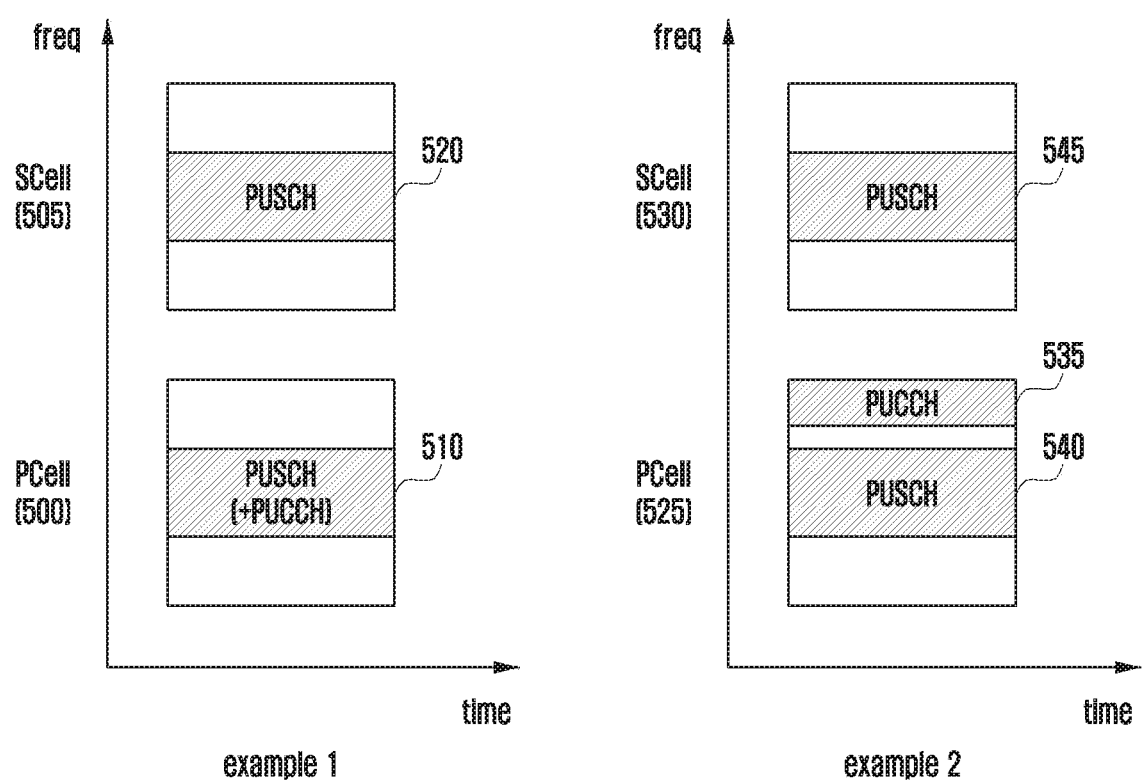
FIG. 5 is a diagram illustrating an uplink transmission method in accordance with configuration and uplink kinds according to an embodiment of the disclosure.

FIG. 5 is a diagram illustrating an uplink transmission method in accordance with configuration and uplink kinds according to an embodiment of the disclosure.

Referring to FIG. 5, example 1 schematizes a scenario in which a terminal performs uplink transmission in accordance with scheduling of a base station after being configured with two serving cells, that is, PCell 500 and one SCell 505. In this scenario, the terminal is in a situation where the terminal is unable to simultaneously transmit the PUCCH and the PUSCH as described above in one serving cell due to transmission method restrictions and RF structure restrictions. Accordingly, the terminal may transmit embedded PUCCH information during the PUSCH transmission.

In this case, the PUCCH information is transmitted to the PCell, and if there is no PUSCH being transmitted to the PCell, it is transmitted to the SCell having a low index among the SCells. The PHR message as described above is transmitted on a part of the PUSCH, and thus, in this scenario, the terminal should report only a power headroom value obtained by subtracting a transmission power being consumed for PUSCH transmission 510 or 520 from the maximum transmission power (PCMAX,c) for each serving cell. This is called a type 1 power headroom.

In the same manner, example 2 schematizes a scenario in which a terminal performs uplink transmission in accordance with the scheduling of the base station after being configured with two serving cells, that is, PCell 525 and one SCell 530. In this scenario, the terminal is in a situation where the terminal has capability of simultaneously transmitting the PUCCH and the PUSCH in one serving cell, or the terminal transmits the PUCCH and the PUSCH separately from each other using the uplink transmission technology capable of performing the simultaneous transmission as described above. In this case, in case of the Cell (or if the PUCCH can be transmitted to the SCell, the corresponding SCell is the same), it is necessary for the terminal to report the power headroom value obtained by subtracting all the corresponding USCH transmission and the PUCCH transmission value from the maximum transmission power (PCMAX,c) of the PCell in consideration of not only the PUSCH transmission 540 but also transmission waves being consumed for the PUCCH transmission 535. This is called a type 2 power headroom.

Figure 6:
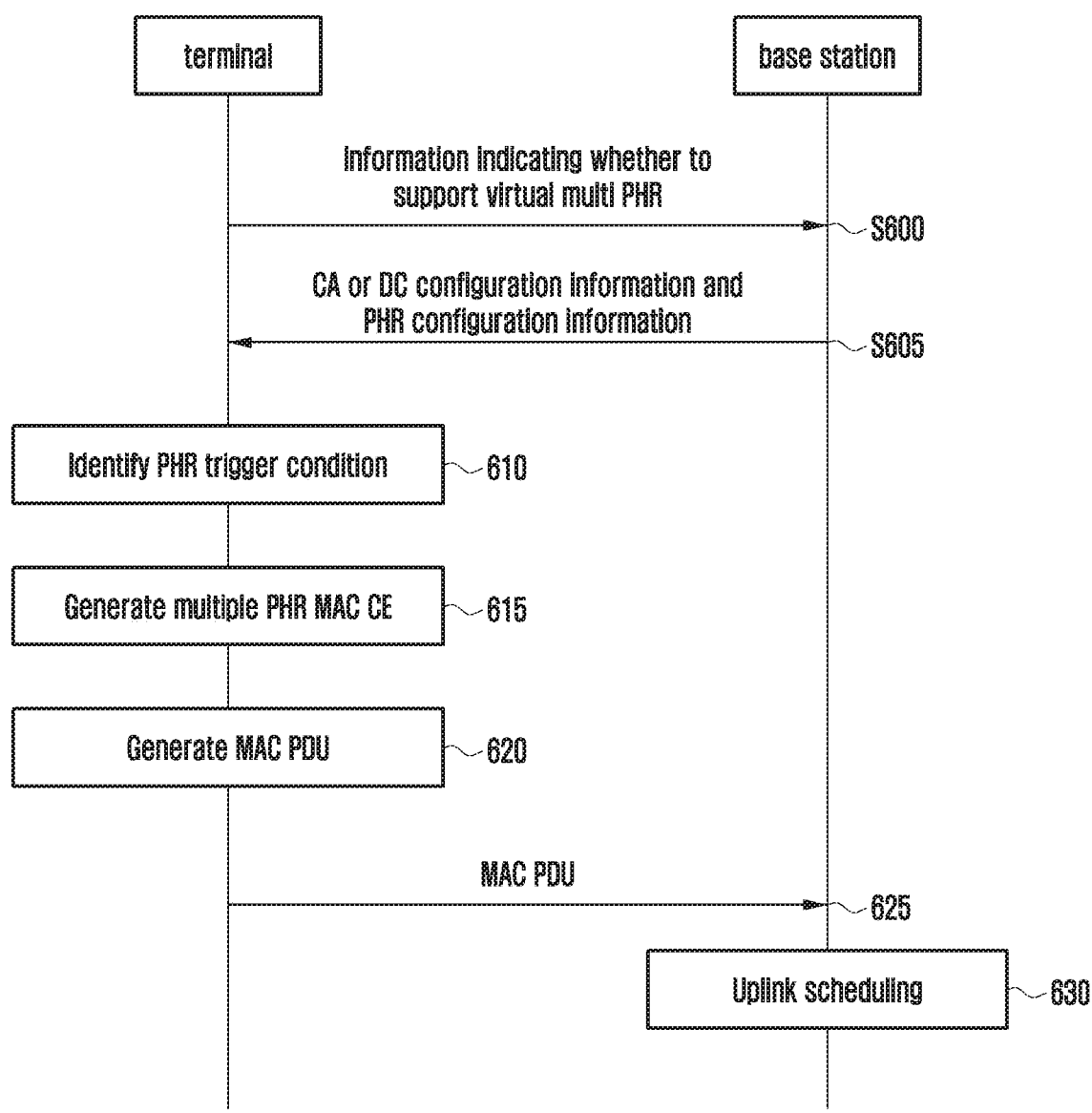
FIG. 6 is a flowchart of a message transmission method between a terminal and a base station for multiple PHRs according to an embodiment of the disclosure.

FIG. 6 is a flowchart of a message transmission method between a terminal and a base station for multiple PHRs according to an embodiment of the disclosure.

Referring to FIG. 6, at operation S600, the terminal may transmit, to the base station, information indicating whether to support a virtual multi PHR proposed in the disclosure.

For example, the information indicating whether to support the virtual multi PHR may be included in a UECapabilityEnquiry message that the terminal transmits to the base station. Although not illustrated in the drawing, if the terminal receives the UECapabilityEnquiry message from the base station, at operation S600, the terminal may transmit, to the base station, the UE capability message including UE capability information related to the radio access capability of the terminal.

The UE capability message according to various embodiments of the disclosure may include band combination list information that can be supported by the terminal in a wireless communication system supporting a multi RAT dual connectivity (MR-DC) or NR CA. For example, the band combination list information may include a CA-ParametersNR information element including a carrier aggregation related function being defined as a combination per band.

Table 1 illustrates an example in which the terminal includes CA-ParametersNR in the UE capability message that the terminal transmits to the base station.

As illustrated in the table 1, according to various embodiments of the disclosure, the CA-ParametersNR information element may include a new parameter so called virtualmultiplePowerHeadroomReport corresponding to information indicating whether to support the virtual multi PHR proposed in the disclosure, and the terminal may notify the base station whether the terminal can support the virtual multi PHR proposed in the disclosure using the parameter.

For example, the new parameter may indicate whether the terminal proposed in the disclosure can support all virtual type PHRs regardless of the actual transmission. The parameter may be optionally included in the CA-ParametersNR information element, and the field of the parameter may be composed of one bit. For example, if the parameter field value is 1, the terminal can support the method for transmitting all the virtual type PHRs regardless of the actual transmission, and if the parameter field value does not exist, the terminal does not support the PHR transmission method supported in the disclosure.

TABLE 1

```
-- ASN1START
-- TAG-CA-PARAMETERSNR-START
CA-ParametersNR ::= SEQUENCE {
    multipleTimingAdvances ENUMERATED {supported} OPTIONAL,
    virtual-multiplePowerHeadroomReport ENUMERATED {supported}
OPTIONAL,
    parallelTxSRS-PUCCH-PUSCH ENUMERATED {supported}
OPTIONAL,
    parallelTxPRACH-SRS-PUCCH-PUSCH ENUMERATED {supported}
OPTIONAL,
    simultaneousRxTxInterBandCA ENUMERATED {supported}
OPTIONAL,
    simultaneousRxTxSUL ENUMERATED {supported} OPTIONAL,
    diffNumerologyAcrossPUCCH-Group ENUMERATED {supported}
OPTIONAL,
    diffNumerologyWithinPUCCH-Group ENUMERATED {supported}
OPTIONAL,
    supportedNumberTAG ENUMERATED {n2, n3, n4} OPTIONAL,
    ...
}
...
-- TAG-CA-PARAMETERSNR-STOP
-- ASN1STOP
```

At operation S605, the base station may transmit configuration information related to dual connectivity or carrier aggregation and PHR configuration information at operation S605 to the terminal based on the UE capability message received from the terminal.

For example, the configuration information related to the dual connectivity or carrier aggregation and the PHR configuration information may be included in an RRC reconfiguration message to be transmitted to the terminal.

The PHR configuration information (PHR-Config), which is an information element (IE) being used to configure a parameter for the PHR according to various embodiments of the disclosure, may include a multiplePHR parameter and a multiplePHRType parameter in relation to the multiple PHR transmission.

As illustrated in Table 2, power headroom report (PHR)-Config may include the multiplePHR parameter and the multiplePHRType parameter in relation to the multiple PHR transmission.

TABLE 2

```
PHR-Config ::= SEQUENCE {
    phr-PeriodicTimer ENUMERATED {sf10, sf20, sf50,
sf100, sf200,sf500, sf1000, infinity},
    phr-ProhibitTimer ENUMERATED {sf0, sf10, sf20,
sf50, sf100,sf200, sf500, sf1000},
    phr-Tx-PowerFactorChange ENUMERATED {dB1, dB3,
dB6, infinity},
    multiplePHR BOOLEAN,
    multiplePHRType ENUMERATED
{legacy ,virtual}
    phr-Type2SpCell BOOLEAN,
    phr-Type2OtherCell BOOLEAN,
    phr-ModeOtherCG ENUMERATED {real, virtual}
}
```

The PHR-Config may include parameters for the PHR report as described in the table 2, such as related periodicPHR-Timer, prohibitPHR-Timer, and dl-PathlossChange (phr-Tx-PowerFactorChange).

For example, the periodicPHR-Timer is a timer configured to periodically report the PHR value to the base station, the prohibitPHR-Timer is a timer configured to avoid frequent PHR reports, and the dl-PathlossChange(phr-Tx-PowerFactorChange) value is a threshold value to report the PHR in accordance with a case where the reception change of the downlink channel is equal to or larger than the above-described value.

According to various embodiments of the disclosure, the multiple PHR parameter indicates whether the multiple PHRs are used.

For example, the multiple PHR transmission may be configured by the multiplePHR parameter existing in PHR-Config of 3GPP NR 38.331, and the multiplePHR parameter may indicate whether to report the power headroom using a single entry PHR MAC control element defined in TS 38.321 or a multi entry PHR MAC control element.

For example, if the multiplePHR parameter is true, it means that it is configured to report the multiple PHR using the multi entry PHR MAC control element, whereas if the multiplePHR parameter is false, it means that the PH is reported using the single entry PHR MAC control element. Meanwhile, in case of the NR and in case of the MR-DC and UL CA, the network configures the multiplePHR parameter field to true, and in all other cases, it may configure the field to false.

According to various embodiments of the disclosure, the multiplePHRType parameter may indicate the transmission method of the multiple PHR of the terminal. For example, if the multiplePHRType is configured to "legacy", the terminal may report the multiple PHR as in the existing standard, and if it is configured to "virtual", the terminal may transmit the virtual type multi PHR in which all entry information of the multi PHR is generated as the virtual PH in all.

That is, if the multiplePHRType is configured to "legacy", the terminal may use a first type multi MAC CE format illustrated in FIG. 8, whereas if the multiplePHRType is configured to "virtual", the terminal may transmit the multi PHR using a second type multi MAC CE format illustrated in FIG. 9.

At operation 610, the terminal may identify a PHR trigger condition based on the PHR configuration information.

In accordance with the configured parameter, the terminal may determine whether to trigger the PHR report in accordance with the following conditions with respect to respective base stations. The following conditions correspond to PHR trigger conditions described in TS 38.321.

phr-ProhibitTimer expires or has expired and the path loss has changed more than phr-Tx-PowerFactorChange dB for at least one activated Serving Cell of any MAC entity which is used as a pathloss reference since the last transmission of a PHR in this MAC entity when the MAC entity has UL resources for new transmission;

NOTE 1: The path loss variation for one cell assessed above is between the pathloss measured at present time on the current pathloss reference and the pathloss measured at the transmission time of the last transmission of PHR on the pathloss reference in use at that time, irrespective of whether the pathloss reference has changed in between.

phr-PeriodicTimer expires;

upon configuration or reconfiguration of the power headroom reporting functionality by upper layers, which is not used to disable the function;

activation of an SCell of any MAC entity with configured uplink;

addition of the PSCell (i.e. PSCell is newly added or changed);

phr-ProhibitTimer expires or has expired, when the MAC entity has UL resources for new transmission, and the following is true for any of the activated Serving Cells of any MAC entity with configured uplink:

there are UL resources allocated for transmission or there is a PUCCH transmission on this cell, and the required power backoff due to power management (as allowed by P-MPRc as specified in TS 38.101-1 [14], TS 38.101-2 [15], and TS 38.101-3 [16]) for this cell has changed more than phr-Tx-PowerFactorChange dB since the last transmission of a PHR when the MAC entity had UL resources allocated for transmission or PUCCH transmission on this cell.

NOTE 2: The MAC entity should avoid triggering a PHR when the required power backoff due to power management decreases only temporarily (e.g. for up to a few tens of milliseconds) and it should avoid reflecting such temporary decrease in the values of PCMAX,f,c/PH when a PHR is triggered by other triggering conditions.

In case that the downlink reception strength change is equal to or higher than the value of dl-PathlossChange dB configured by the base station in a state where the prohibitPHR-Timer expires In case that the periodicPHR-Timer configured by the base station for aperiodic report expires In case that the PHR report is initially configured In case that the SCell including the uplink is added In case that the primary SCell of the secondary base station is added when the dual connectivity technology is used At operation 615, the terminal may generate the multi PHR MAC CE.

If the PHR triggering condition occurs in respective base stations in the wireless communication system supporting the MR-DC or uplink CA, the terminal may generate the multi PHR MAC CE by calculating the PH with respect to all the serving cells currently configured and activated of all the base stations. In this case, the multi entry PHR MAC control element may have a multi PHR MAC CE format including the PH and additional information for the plurality of cells.

The multi PHR MAC CE according to various embodiments of the disclosure may include the first type multi PHR MAC CE and the second type multi PHR MAC CE.

For example, in case that the multiplePHR included in the PHR information is true, and the multiplePHRType is legacy, the terminal may generate the first type multi PHR MAC CE illustrated in FIG. 8 by determining V fields value in consideration of an actual transmission/non-transmission of the terminal.

Further, in case that the multiplePHR included in the PHR information is true, and the multiplePHRType is virtual, the terminal may generate the second type multi PHR MAC CE illustrated in FIG. 9 calculated in all as virtual PHs by configuring the V field to 1 in all regardless of the actual transmission/non-transmission of the terminal. This will be described in detail with reference to FIGS. 8 and 9.

The first type multi PHR MAC CE format is the multi PHR MAC CE format in the related art for calculating the PH in consideration of the actual transmission/non-transmission of the terminal, and the second type multi PHR MAC CE format is the virtual multi PHR MAC CE format calculated in all as the virtual PHs regardless of the actual transmission/non-transmission of the terminal proposed in the disclosure.

At operation 620, the terminal may generate a MAC PDU including the multi PHR MAC CE, and at operation 625, the terminal may transmit the MAC PDU to the base station.

For example, the terminal may generate the MAC PUD, multiplex the PHR MAC CE into the MAC PDU, and transmit the MAC PDU to the base station. Further, the terminal stores a pathloss, PCMAX, P-MPR, and actual transmission/non-transmission applied when calculating the PH for each serving cell. For example, the MAC PDU will be described in detail with reference to FIG. 7.

At operation 630, the base station may perform uplink scheduling based on the MAC PDU information received from the terminal.

For example, if the PHR MAC CE is received through the MAC PDU, the base station may determine whether to apply the PH or P-MPR for each serving cell and whether the change of the PH is caused by the change of the P-MPR, and in consideration of this, the base station may allocate to uplink transmission resource to the terminal.

Figure 7:
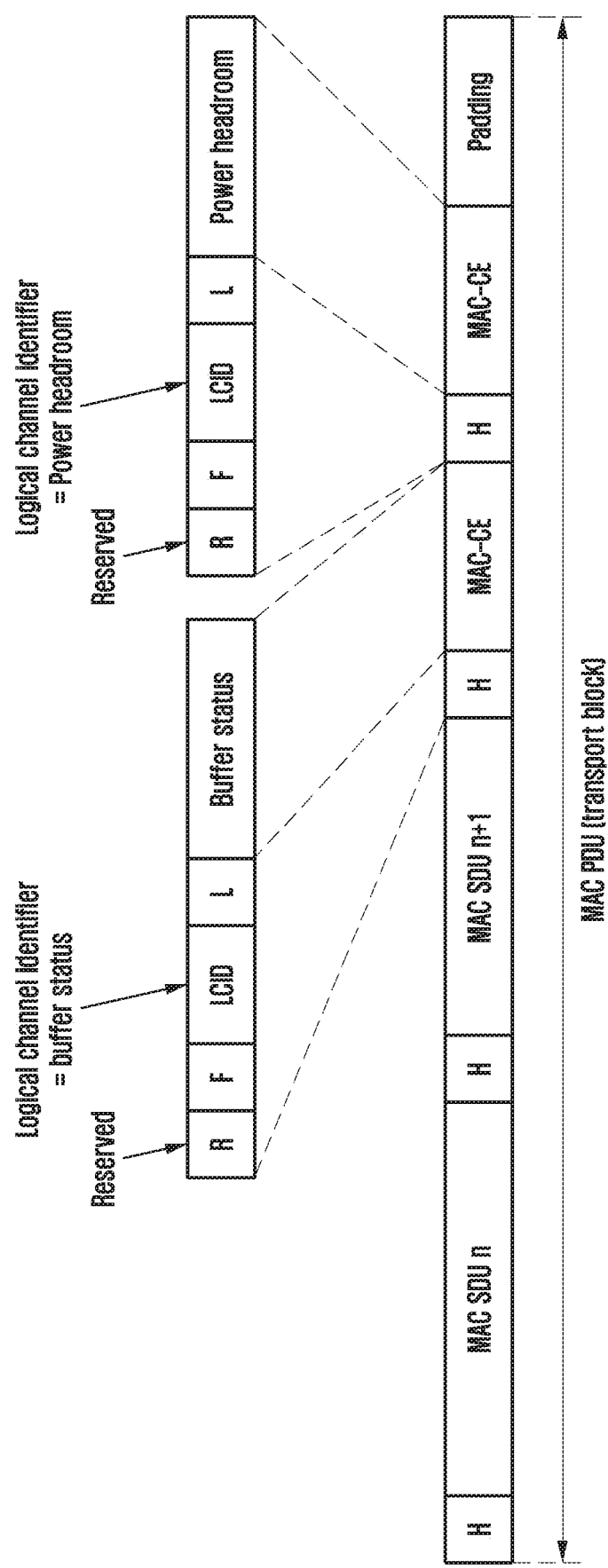
FIG. 7 is a diagram illustrating a structure of a MAC protocol data unit (PDU) for power reports according to an embodiment of the disclosure.

FIG. 7 is a diagram illustrating the structure of a MAC PDU for power reports according to an embodiment of the disclosure.

Referring to FIG. 7, the MAC PDU includes at least one MAC control element (MAC-CE), at least one MAC service data unit (SDU) and padding, and at least one sub-header attached for each MAC SDU or MAC CE.

The MAC control element is a control message generated by a MAC layer. The MAC SDU is equal to the RLC PDU transferred on a radio link control (RLC) layer. The padding is a specific number of bits being added to maintain the constant size of the MAC PDU.

Referring to FIG. 7, each sub-header includes four fields of R, F, LCID, and L, and the respective sub-header fields are explained as follows.

R (1 bit): Reserved field

LCID (5 bits): This indicates a logical channel ID field, and types of a logical channel or MAC CE, to which the MAC SDU belongs.

F (1 bit): Format field. This indicates whether the next L field is of 7 bits or 15 bits.

L (7 or 15 bits): Length field. This indicates the length of the MAC CE or MAC SDU corresponding to a sub-header.

The F and L fields are not included even in the MAC sub-header corresponding to the MAC CE of a fixed size.

That is, the LCID field is an identification field for identifying the logical channel corresponding to the MAC SDU or the type of the MAC control element or padding.

FIG. 8 is a diagram illustrating a first type multi PHR MAC CE format according to an embodiment of the disclosure.

As described above, if it is required to report a plurality of PHs for aggregated serving cells in a mobile communication system in which dual connectivity between multiple RATs or uplink carrier aggregation is supported, that is, several carriers are aggregated, it is advantageous in reducing an overhead to gather them in one PHR to be transmitted.

For example, if it is required to report the PH for several serving cells in a mobile communication system in which the terminal communicates with one or more cells related to the first base station and one or more cells related to the second base station, the multiple PHR MAC CE may be generated by gathering PH information and PCMAX,c information of several cells in one PHR so as to report them together.

Referring to FIG. 8, in contrast with a general single PHR MAC CE in the related art, the multiple PHR MAC CE is designed to be able to report the PH information and PCMAX,c information of several cells together.

C field information in the byte 800 illustrated in FIG. 8 is a bitmap indicating of what serving cell among aggregated serving cells the PH is included in the corresponding PHR. Each bit of the bitmap coincides with an SCell index, and corresponds to one SCell.

That is, in the multiple PHR format, a combination of bits corresponding to respective SCells is included in a byte 800. The respective bits are used to indicate of what SCell the PH information is included in the format. In case that the value of the bit is inscribed as 1, it means that the PH information of the SCell corresponding to the corresponding bit is included in the PHR format. After the byte 800, one or more bytes are used to inscribe the PH information of the Cell and SCell.

With respect to the one serving cell, bytes 820, 830, and 835 including at least one PH information and bytes 825 and 840 selectively including terminal transmission power information (PCMAX) are generated. The PH information is inscribed in the PH field, and the field is composed of 6 bits. In the byte including the PH, a P field 805 and a V field 810 are included in addition to the PH field.

The P field 805 is used to indicate whether the terminal transmission power limited in accordance with the regulations and rules rather than a radio power control cause exerts an influence on the PH information.

The V field 810 is used to indicate a case where an actual transmission does not occur and the PH information is generated by substituting a predefined parameter therefor. If the V field is configured to 1, it means that the predefined parameter is used, and in this case, the terminal transmission power information inscribed in another byte will be omitted.

A byte including the terminal transmission power information corresponding to the information of the PH field follows the byte including the PH field. The byte includes a Pcmax field for inscribing the terminal transmission power information, and the field is composed of 6 bits. R 815 that is the remaining two bits of the byte is a reserved bit that is not used to inscribe certain information.

In case that a PCell and PH information of one or more SCells are included in one PHR format, information corresponding to the PCell is first stored, and then the PH information corresponding to the SCells is stored in an ascending order of SCell indexes.

For example, the PH information of respective carriers in contiguous bytes is configured in an ascending order of Type 1 PH 760 and PCMAX 765 of a PCell, Type X PH 830 of an SCell having the lowest index, Type X PH 835 and PCMAX 840 of an S Cell having the second lowest index, Type X PH and PCMAX of an SCell having the third lowest index, and Type X PH and PCMAX of an SCell having the fourth lowest index.

As described above with reference to FIG. 5, in case of a PCell, a PUCCH exists, and a PUSCH and PUCCH may be simultaneously transmitted in accordance with a network and terminal capability. In case that the PUSCH and the PUCCH are simultaneously used, in order to calculate the PH, it is required to exclude both the transmission power amount allocated to the PUSCH and the transmission power amount allocated to the PUCCH from the maximum transmission power amount of the terminal. In case that the PUSCH and the PUCCH are simultaneously used, the base station pre-indicates this to the terminal through the PUCCH configuration.

In order to provide the PH when the PUSCH is singly transmitted, Type 1 PH is used, and in order to provide the PH when the PUSCH and the PUCCH are transmitted together, Type 2 PH is used.

Type 1 PH is defined by Pcmax-PPUSCH. Here, the PPUSCH is the power amount allocated to the PUSCH. Type 2 PH is defined by Pcmax-PPUSCH-PPUCCH. Here, the PPUCCH is the power amount allocated to the PUCCH. If simultaneous usage of the PUSCH and the PUCCH is not indicated in the PUCCH configuration, only Type 1 PH should be used. Otherwise, Type 1 PH and Type 2 PH are used together.

Type 2 PH is applied to the PCell only, but is not applied to the SCell, in a carrier aggregation (CA) system. If the simultaneous usage of the PUSCH and the PUCCH is indicated in the PUCCH configuration, Type 1 PH and Type 2 PH are included in all as the PH for the PCell. In order to interpret Type 2 PH, the PH of the PCell is deployed in front in consideration of a fact that Type 1 PH is necessary. In case of the SCell, if the ul-Configuration is configured, Type 3 PH is applied, and otherwise, Type 1 PH is applied. Accordingly, in case of the SCell in the current PHR format, only one PH of Type 1 PH or Type 3 PH is reported. For example, if the PUSCH is configured on the configured uplink, Type 1 PH is used, whereas if only the SRS is configured, Type 3 PH is used. If the PUSCH and the PUCCH are transmitted together, Type 2 PH is used.

The terminal calculates the power headroom using the following mathematical expression. The corresponding Equation assumes a time when only the PUSCH is transmitted.

$$PH(i) = P_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i)\}$$

Equation 1

In serving cell c, PH(i) of the i-th subframe is calculated by the maximum uplink transmission power $P_{CMAX,c}(i)$, the number of resource blocks $M_{PUSCH,c}(i)$, a power offset $\Delta_{TF,c}$ derived from the aMCS, a pathloss $P_{Lc}$, and accumulated TPC commands $f_c(i)$. In the above-described mathematical expression, $P_{Lc}$ is a pathloss of a cell being configured to provide the pathloss with respect to the serving cell c. The pathloss being used to determine the uplink transmission output of a certain serving cell may be a pathloss on a forward channel of the corresponding cell, or a pathloss on a forward channel of another cell. The base station selects what pathloss between them is to be used, and notifies the terminal of this. In the above-described mathematical expression, $f_c(i)$ is an accumulated value of a transmission power control command of the serving cell c. Further, $P_{O\_PUSCH,C}$ is a parameter on a higher layer, and is obtained as a sum of cell-specific and UE-specific values. In general, $P_{O\_PUSCH,C}$ is applied as a different value in accordance with the kind of physical uplink shared channel (PUSCH) transmission, such as semi-persistent scheduling, dynamic scheduling, or random access response. Further, $\alpha c$ is a 3-bit cell-specific value being provided on a higher layer, and is a weight value (i.e., as this value becomes higher, the pathloss exerts more influence on the uplink transmission output) that is applied to the pathloss when the uplink transmission output is calculated, and its applicable value is limited depending on the kind of PUSCH transmission. Further, a j value is used to indicate the kind of the PUSCH. In case of j=0, it indicates semi-persistent scheduling, and in case of j=1, it indicates dynamic scheduling. In case of j=2, it indicates a random access response. In the above-described Equation 1, if there is no PUSCH transmission in a specific serving cell, $M_{PUSCH}$ and $\Delta_{TF}$ may not be applied to the above-described formula in accordance with the definition.

Even if there is not the actual PUSCH transmission, the base station may trigger the PH to obtain the pathloss information on a specific uplink. If the PHR is triggered with respect to a specific serving cell, the terminal determines a PH value calculation method depending on whether the PUSCH is transmitted. If there is the PUSCH transmission with respect to the corresponding serving cell, the PH is calculated using the Equation 1 as in the technology in the related art. In case that there is not the PUSCH transmission in the corresponding serving cell, it means that there is not an allocated transmission resource, and because it is not clear what value is to be used as $M_{PUSCH}$ and $\Delta_{TF}$, a device is necessary, whereby the base station and the terminal can calculate the PH using the same $M_{PUSCH}$ and $\Delta_{TF}$. This can be solved, for example, by determining a transmission format (transmission resource amount and MCS level) to be used for the PH calculation in case that the terminal and the base station do not have the PUSCH transmission. If one RB and the lowest MCS level are assumed as such a reference transmission format, $M_{PUSCH}$ and $\Delta_{TF}$ become 0, respectively, and this means the same meaning as omission of them from the mathematical expression 1. That is, because the data transmission is not performed in the actual corresponding serving cell, $P_{CMAX,c}(i)$ does not exist. Accordingly, it is necessary to determine what value $P_{CMAX,c}(i)$ is to be determined. With respect to such a virtual transmission, virtual $P_{CMAX,c}(i)$ is defined and applied. Further, $P_{CMAX,c}(i)$ may be determined using $P_{EMAX}$ that is the maximum transmission output allowed in the corresponding cell and $P_{powerclass}$ that is the inherent maximum transmission output of the terminal. For example, it may be determined as follows.

$$P_{CMAX,c} = \min\{P_{EMAX}, P_{powerclass}\} \quad \text{Equation 2}$$

Here, is determined with a relationship of $P_{CMAX\_L} \leq P_{CMAX} \leq P_{CMAX\_H}$. In this case, if zero power back-off is considered, $P_{CMAX\_L} = P_{CMAX\_H}$ is determined and thus $P_{CMAX} = P_{CMAX\_H}$ is determined. In this case, $P_{CMAX\_H}$ is a smaller value between $P_{powerclass}$ and $P_{EMAX}$. Here, $P_{EMAX}$ is the cell-specific maximum allowable transmission power, and Ppowerclass is the UE-specific maximum allowable transmission power.

As described above, C field information illustrated in FIG. 8 may be used to distinguish other base stations transferring PHR information, and a V field value indicates whether uplink transmission to the corresponding base station has actually been performed.

For example, if the actual uplink transmission has been performed, the V field value is configured to 0 (V=0), and otherwise, the V field value is set to 1 (V=1), and the PH calculated on the assumption that RB 1 is transmitted in a reference transmission format is reflected. In this case, the PH, which is calculated on the assumption that the V is configured to V=1 and RB 1 is transmitted in the reference transmission format, is called a virtual PH, and transmission of the virtual PH means transmission of the PHR in a virtual type.

The power headroom (PH) information means information on the size of the power remaining during transmission of the uplink data including the power headroom report (PHR), and for this, an index value being converted into a decibel (dB) unit is used.

Accordingly, the base station can be aware of the transmission power of the terminal through the PH value received from the terminal, and because the base station can efficiently perform scheduling while controlling the transmission power of the corresponding terminal, the base station having received the transmitted multiple PHRs can calculate the transmission power of the terminal to the respective base stations by analyzing the PH information of the respective base stations.

However, because the PH information is varied in accordance with the size of resource being allocates as a relative value, only the original PH information for simply notifying of what dB the power remains is insufficient, but even information for notifying of what dB the power remains in case that how many RBs are transmitted is necessary.

As described above, in order for the PH information to have a meaning, even information on how many RBs are allocated actually on a certain channel at the corresponding time is necessary, and thus the base station having received the transmitted multiple PHRs from the terminal requires additional information on how many RB resources are allocated or allocation onto a control channel is performed at the corresponding time from other base stations for which the V field value is configured to 0 (which has actually transmitted the uplink data).

That is, according to the first type multi PHR MAC CE format illustrated in FIG. 8, it is necessary to exchange scheduling information between base stations depending on whether the base station has actually transmitted the data channel or control channel for the power control of the terminal when the base station uses the multiple power headroom reports (PHRs).

Thus, according to the first type multi PHR MAC CE format illustrated in FIG. 8, the base station should exchange scheduling information, such as the RB size, with all the base stations having received the multiple PHRs for which the V field is configured to 0, and as the number of supporting CA base stations is increased, the amount of information exchange between the base stations is also increased in proportion to this to cause a problem.

In order to solve the above-described problem, an aspect of the disclosure is to perform effective scheduling, such as uplink power control and allocated resource size adjustment, without exchanging the scheduling information between the base stations even if the terminal transmits the multiple PHRs in the uplink CA environment.

For this, the disclosure proposes a virtual multi PHR MAC CE format in which all entry information of multiple PHRs is generated as virtual PHs by generating a plurality of PHs corresponding to a plurality of serving cells regardless of actual transmission/non-transmission of the terminal, and the virtual multi PHR MAC CE format may be called the second type multi PHR MAC CE format illustrated in FIG. 9.

FIG. 9 is a diagram illustrating a second type multi PHR MAC CE format according to an embodiment of the disclosure.

The disclosure provides a method in which a terminal transmits all entry information of multiple power headroom reports (PHRs) for a plurality of aggregated serving cells as virtual PHs in a wireless communication system supporting multiple RAT double connectivity or uplink CA.

Referring to FIG. 9, because V fields 910 are all configured to 1 regardless of an actual transmission/non-transmission of the terminal, the second type multi PHR MAC CE includes virtual PHs 920, 925, and 930 calculated on the assumption that RB 1 is transmitted in the reference transmission format.

The first type multi PHR MAC CE format illustrated in FIG. 8 requires the scheduling information exchange between the base stations depending on actual transmission/non-transmission of a data channel or a control channel for the power control of the terminal, whereas the second type multi PHR MAC CE format illustrated in FIG. 9 is a virtual multi PHR MAC CE format in which all entry information of multiple PHRs corresponding to a plurality of serving cells is generated as virtual PHs in all, and thus it does not require the scheduling information exchange between the base stations.

According to the disclosure, the terminal transmits the virtual multi PHR MAC CE format in which all entry information of multiple PHRs is generated as virtual PHs in a wireless communication system supporting multiple RAT dual connectivity or uplink CA, and thus an effective scheduling, such as uplink power control and allocated resource size adjustment, can be performed on the assumption of 1 RB transmission without exchanging the scheduling information between the base stations.

Figure 10:
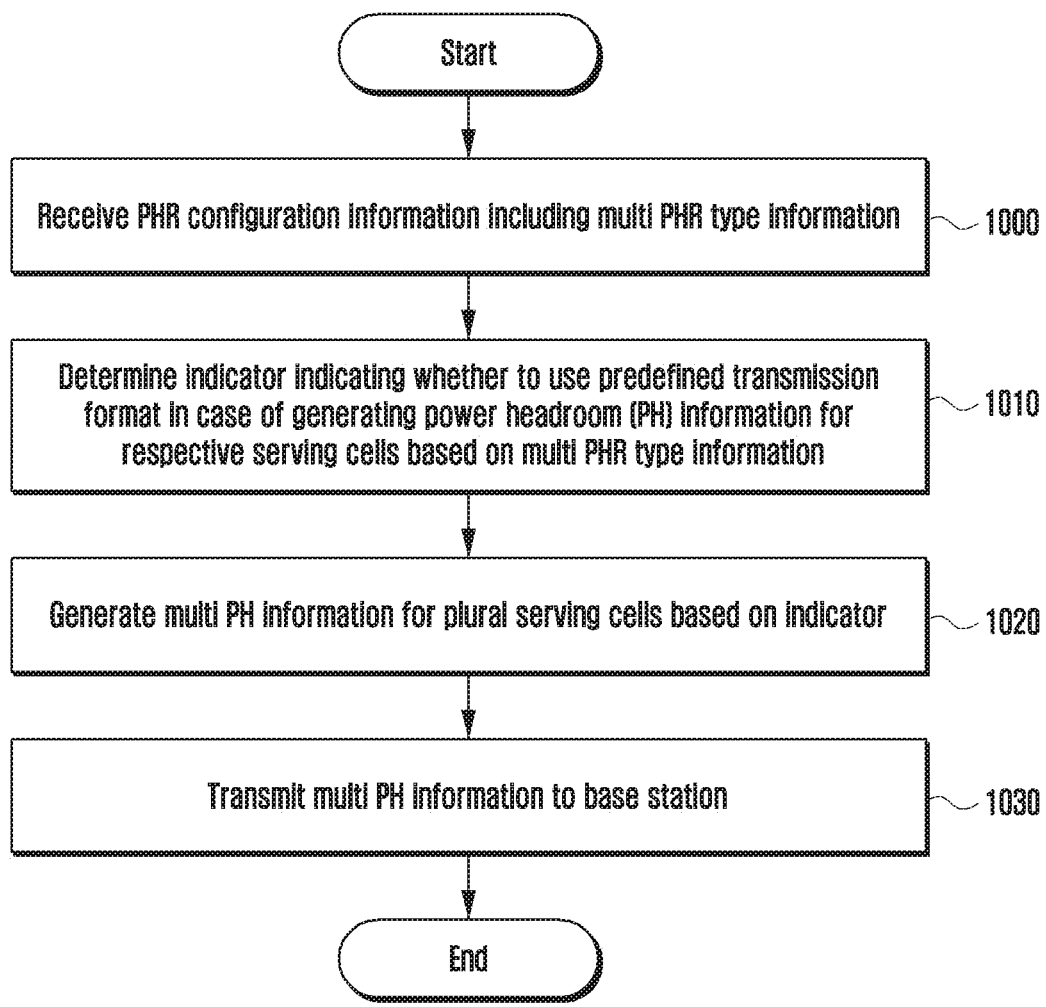
FIG. 10 is a flowchart of a method by a terminal for transmitting multiple PH information to a base station based on multiple PHR type information according to an embodiment of the disclosure.

FIG. 10 is a flowchart of a method by a terminal for transmitting multiple PH information to a base station based on multiple PHR type information according to an embodiment of the disclosure.

Referring to FIG. 10, at operation 1000, the terminal may receive PHR configuration information including multi PHR type information from the base station.

For example, the multi PHR type information is information indicating the first type multi PHR MAC CE format or the second type multi PHR MAC CE format. The multi PHR type information corresponds to the multiplePHRType parameter described in Table 1.

At operation 1010, the terminal may determine an indicator indicating whether a predefined transmission format is used in case of generating the power headroom (PH) information on each of a plurality of serving cells based on the multi PHR type information received at operation 1000.

For example, the indicator indicating whether the predefined transmission format is used corresponds to the V field of the multi PHR MAC CE format, and is a one-bit indicator corresponding to each of the serving cells.

If the multi PHR type information indicates the usage of the first type multi PHR MAC CE format illustrated in FIG. 8, the terminal may configure the V field value included in the first type multi PHR MAC CE format based on whether uplink transmission to the serving cell is performed.

If there is the uplink transmission to the serving cell as described above, the V field value corresponding to the corresponding serving cell may be configured to 0, whereas if not, the V field value may be configured to 0.

If the multi PHR type information indicates the second type multi PHR MAC CE format illustrated in FIG. 9, the terminal may configure the V field value included in the second type multi PHR MAC CE format to 1 in all without considering whether the uplink transmission to the serving cell is performed.

At operation 1020, the terminal may generate the multi PH information for a plurality of serving cells based on the indicator determined at operation 1010.

For example, if the value of the indicator corresponding to each serving cell is 1, the terminal may generate virtual PH information of the serving cell based on the predefined transmission format, whereas if the value of the indicator is 0, the terminal may generate the PH of the serving cell based on the value used when actually transmitting the uplink to each serving cell.

In a wireless communication system in which the plurality of serving cells are aggregated, the terminal may generate the multi PH information on the plurality of serving cells by including all the PH information determined by the indicator corresponding to each serving cell. For example, the multi PH information is information included in the multi PHR MAC CE format illustrated in FIGS. 8 and 9.

At operation 1030, the terminal may transmit the multi PH information generated at operation 1020 to the base station.

The generated multi PH information may be transferred using the first type multi PHR MAC CE format or the second type multi PHR MAC CE format based on the multi PHR type information.

Figure 11:
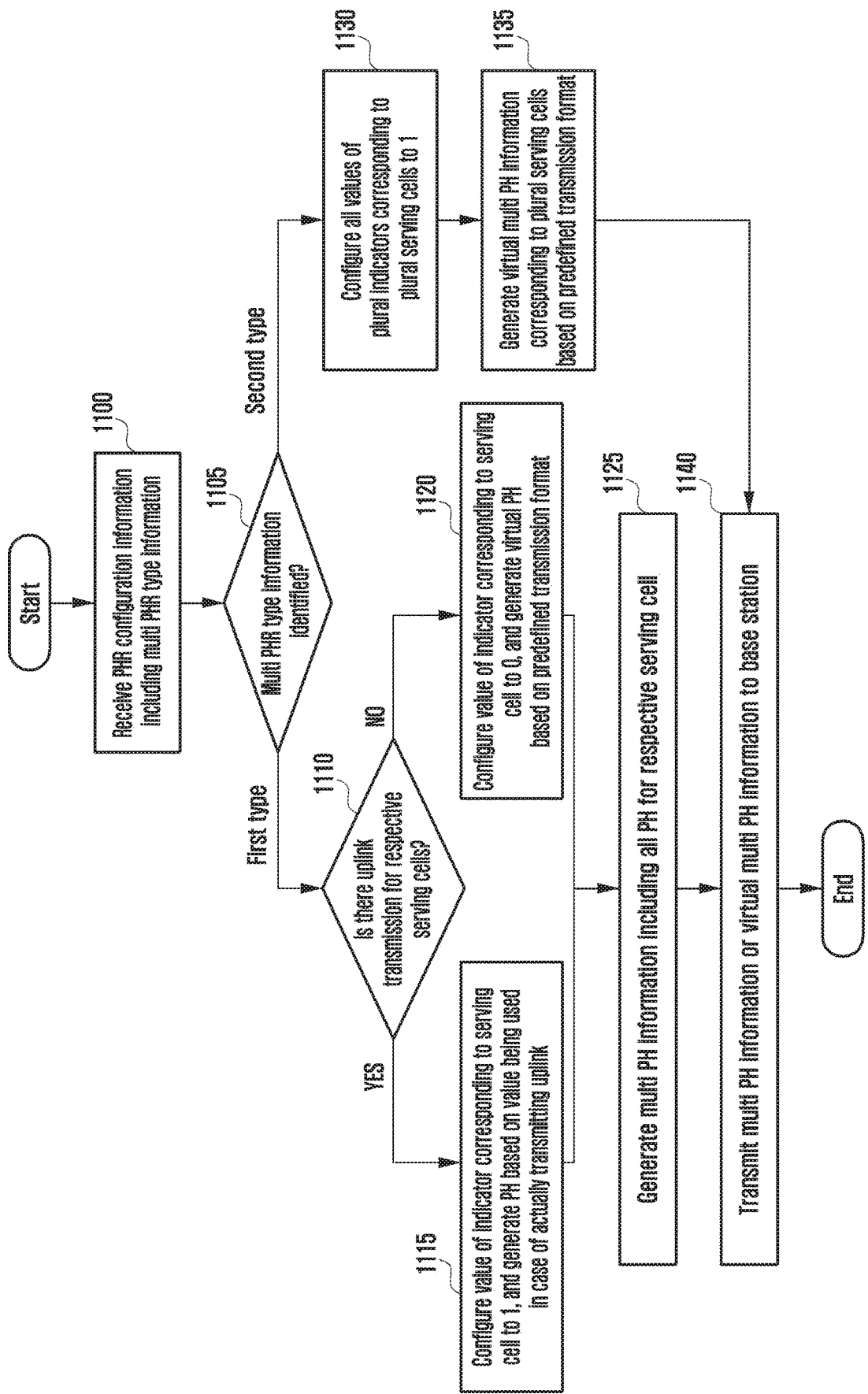
FIG. 11 is a flowchart of a method by a terminal for transmitting multiple PH information based on a first type multi PHR MAC CE format and a second type multi PHR MAC CE format according to an embodiment of the disclosure.

FIG. 11 is a flowchart of a method by a terminal for transmitting multiple PH information based on a first type multi PHR MAC CE format and a second type multi PHR MAC CE format according to an embodiment of the disclosure.

Referring to FIG. 11, at operation 1100, the terminal receives PHR configuration information including multi PHR type information from the base station, and identifies the received multi PHR type information at operation 1105.

If the multi PHR type information indicates the first type multi MAC CE format at operation 1105, the terminal may determine whether to transmit an uplink for each serving cell at operation 1110.

If there is the uplink transmission to the serving cell at operation 1110, the terminal, at operation 1115, may configure the value of the indicator corresponding to the serving cell to 1, and may generate the PH for the serving cell based on the value used when the uplink is actually transmitted.

If there is not the uplink transmission to the serving cell at operation 1110, the terminal, at operation 1120, may configure the value of the indicator corresponding to the serving cell to 0, and may generate a virtual PH for the serving cell based on the predefined transmission format.

At operation 1125, the terminal may generate the multi PH information including all the PHs for the respective serving cells generated at operation 1115 or operation 1120. For example, the multi PH information may be generated in the form of the first type multi PHR MAC CE format.

Meanwhile, if the multi PHR type information indicates the second type multi MAC CE format at operation 1105, the terminal may configure all values of the plurality of indicators corresponding to the plurality of serving cells to 1 at operation 1130, and may generate the virtual multi PH information corresponding to the plurality of serving cells based on the predefined transmission format at operation 1135. The virtual multi PH information may be generated in the form of the second type multi PHR MAC CE format, and in this case, the multiple PHs are featured to be the virtual PHs in all. The virtual multi PH information is information included in the virtual multi PHR MAC CE format, that is, the second type multi PHR MAC CE format illustrated in FIG. 9, in which all entry information of multiple PHRs corresponding to a plurality of serving cells is generated as virtual PHs in all.

At operation 1140, the terminal may transmit the multi PH information or the virtual multi PH information to the base station.

For example, if the multi PHR type information indicates the first type multi MAC CE format at operation 1105, the terminal, at operation 1140, may transmit the multi PH information generated at operation 1125 to the base station using the first type multi MAC CE format.

If the second type multi MAC CE format is indicated at operation 1105, the terminal, at operation 1140, may transmit the multi PH information generated at operation 1135 to the base station using the second type multi MAC CE format.

Figure 12:
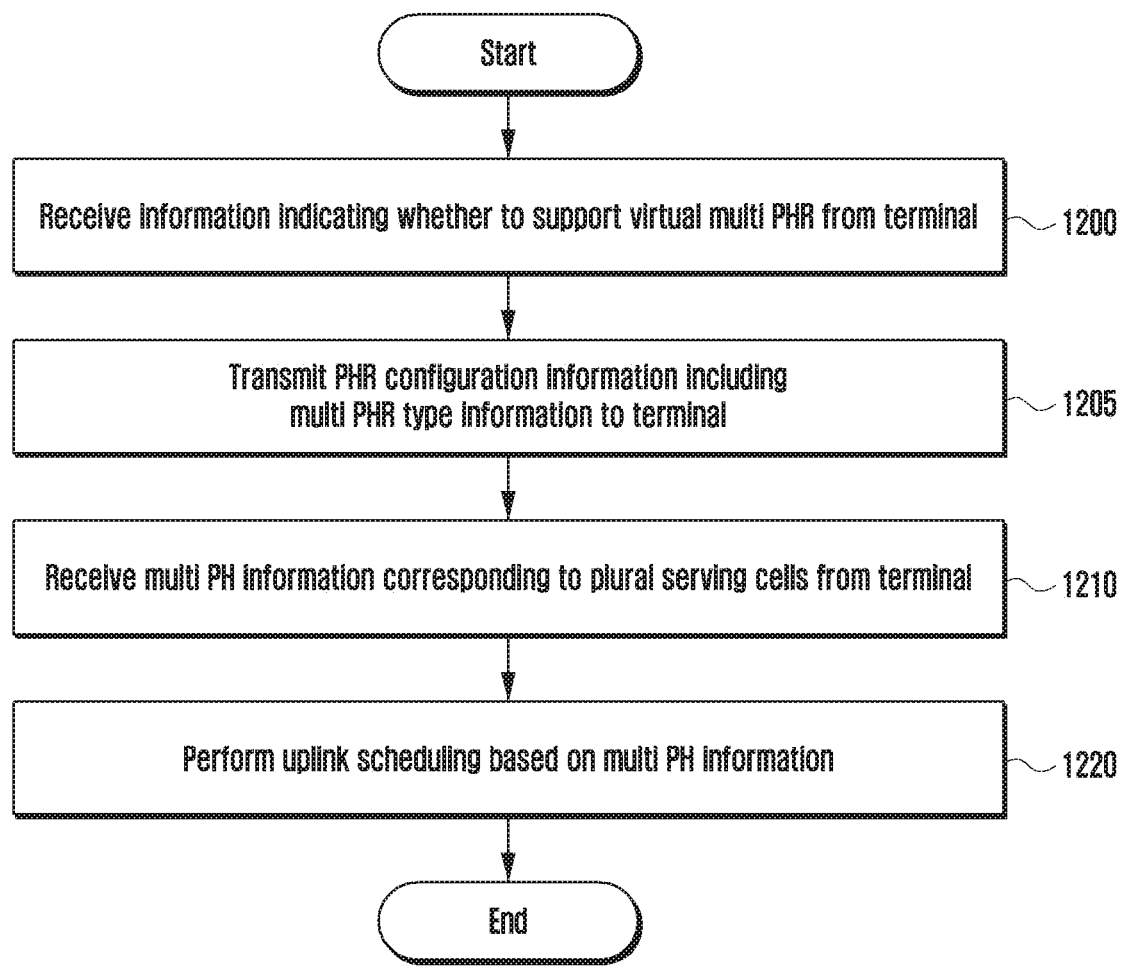
FIG. 12 is a flowchart of a method by a base station for receiving multiple PH information according to an embodiment of the disclosure.

FIG. 12 is a flowchart of a method by a base station for receiving multiple PH information according to an embodiment of the disclosure.

Referring to FIG. 12, at operation 1200, the base station may receive information indicating whether to support the virtual multi PHR from the terminal.

The information on whether to support the virtual multi PHRs of the terminal may indicate whether the terminal can transmit the multi PHRs using the virtual multi PHR MAC CE format in which all entry information of multiple PHRs corresponding to a plurality of serving cells is generated as virtual PHs in all regardless of the actual uplink transmission to the plurality of serving cells.

For example, the information indicating whether to support the virtual multi PHRs may be received through a terminal capability message that the terminal transmits to the base station. The information indicating whether to support the virtual multi PHRs corresponds to the virtual-multiple-PowerHeadroomReport parameter described in Table 2.

At operation 1205, the base station may transmit the PHR configuration information including the multi PHR type information to the terminal.

For example, the PHR configuration information may be transmitted by an RRC reconfiguration message together with the configuration information related to the dual connectivity or carrier aggregation.

The multi PHR type information is information indicating the first type multi PHR MAC CE format or the second type multi PHR MAC CE format. The multi PHR type information corresponds to the multiplePHRType parameter described in Table 1.

At operation 1210, the base station may receive the multi PH information corresponding to the plurality of serving cells from the terminal.

For example, the multi PH information may be transferred through the first type multi PHR MAC CE or the second type multi PHR MAC CE generated by the terminal.

The multi PHR MAC CE format includes the V field corresponding to each serving cell, and the V field is for the indicator indicating whether to use the predefined transmission format when generating the PH information corresponding to the serving cell.

The first type multi PHR MAC CE format includes the V field values determined based on uplink transmission/non-transmission of the terminal with respect to the serving cells.

The second type multi PHR MAC CE format may configure the V field values as predetermined values with respect to the plurality of serving cells regardless of the uplink transmission/non-transmission of the terminal with respect to the serving cells. For example, the plurality of V field values included in the second type multi PHR MAC CE format may be configured to 1 in all, and the multi PH information may be the virtual multi PH information generated based on the predefined transmission format in all.

At operation 1220, the base station may perform uplink scheduling based on the multi PH information received from the terminal.

In case that the base station receives the multi PH information through the first type multi PUR MAC CE format illustrated in FIG. 8, it is necessary to exchange scheduling information between the base stations in accordance with actual transmission/non-transmission of the data channel or the control channel for the power control of the terminal.

Meanwhile, in case that the base station receives the multi PH information through the second type multi PUR MAC CE format illustrated in FIG. 9, that is, through the virtual multi PHR MAC CE format in which all entry information of multiple PHRs corresponding to a plurality of serving cells is generated as virtual PHs in all, it is not necessary to exchange the scheduling information between the base stations.

According to the disclosure, the terminal transmits the virtual multi PHR MAC CE format in which all entry information of multiple PHRs is generated as virtual PHs in a wireless communication system supporting multiple RAT dual connectivity or uplink CA, and thus an effective scheduling, such as uplink power control and allocated resource size adjustment, can be performed on the assumption of 1 RB transmission without exchanging the scheduling information between the base stations.

Figure 13:
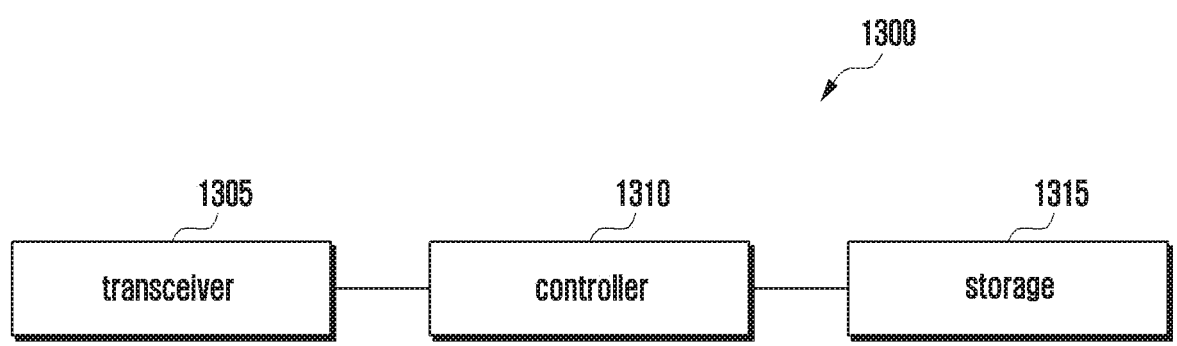
FIG. 13 is a block diagram illustrating an internal configuration of a terminal according to an embodiment of the disclosure.

FIG. 13 is a block diagram illustrating the internal configuration of a terminal according to an embodiment of the disclosure.

Referring to FIG. 13, a terminal 1300 may include a transceiver 1305, a controller 1310, and a storage 1315. In the disclosure, the controller 1310 may be defined as a circuit or application-specific integrated circuit or at least one processor.

The transceiver 1305 transmits and receives signals with another network entity. The transceiver 1305 may receive, for example, system information from a base station, and may receive a synchronization signal, a reference signal, or control information.

The controller 1310 may control the overall operation of the terminal according to an embodiment proposed in the disclosure. For example, the controller 1310 may control a signal flow between respective blocks to perform an operation according to the above-described flowchart.

Specifically, the controller 1310 may control the operation proposed in the disclosure in order to transmit a virtual multi PHR MAC CE format in which all entry information of multiple PHRs corresponding to a plurality of serving cells is generated as virtual PHs regardless of an actual transmission/non-transmission of a terminal in a wireless communication system supporting multiple RAT DC or uplink CA.

The storage 1315 may store at least one of information being transmitted and received through the transceiver 1305 and information generated through the controller 1310. For example, the storage 1315 may store predefined reference transmission format related information in association with the virtual multi PHR MAC CE format transmission.

Figure 14:
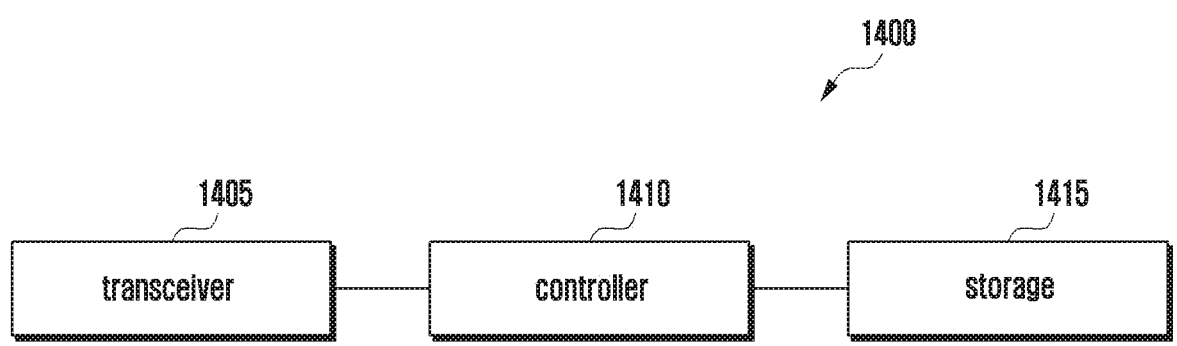
FIG. 14 is a block diagram illustrating an internal configuration of a base station according to an embodiment of the disclosure.

FIG. 14 is a block diagram illustrating the internal configuration of a base station according to an embodiment of the disclosure.

Referring to FIG. 14, a terminal 1400 may include a transceiver 1405, a controller 1410, and a storage 1415. In the disclosure, the controller 1410 may be defined as a circuit or application-specific integrated circuit or at least one processor.

The transceiver 1405 transmits and receives signals with another network entity. The transceiver 1405 may transmit, for example, system information to a terminal, and may transmit a synchronization signal, a reference signal, or control information.

The controller 1410 may control the overall operation of the base station according to an embodiment proposed in the disclosure. For example, the controller 1410 may control a signal flow between respective blocks to perform an operation according to the above-described flowchart.

Specifically, the controller 1410 may control the operation proposed in the disclosure in order to transmit a virtual multi PHR MAC CE format in which all entry information of multiple PHRs corresponding to a plurality of serving cells is generated as virtual PHs regardless of an actual transmission/non-transmission of the terminal in a wireless communication system supporting multiple RAT DC or uplink CA.

The storage 1415 may store at least one of information being transmitted and received through the transceiver 1405 and information generated through the controller 1410. For example, the storage 1415 may store predefined reference transmission format related information in association with the virtual multi PHR MAC CE format transmission.

In the above-described embodiments of the disclosure, the elements included in the disclosure may be expressed in a singular or plural form depending on the proposed detailed embodiment. However, the singular or plural expression has been selected suitably for a situation proposed for convenience of description, and the disclosure is not limited to the singular or plural elements. Although an element has been expressed in the plural form, it may be configured in the singular form. Although an element has been expressed in the singular form, it may be configured in the plural form.

Although the detailed embodiments have been described in the detailed description of the disclosure, the disclosure may be modified in various ways without departing from the scope of the disclosure. Accordingly, the scope of the disclosure should not be limited to the above-described embodiments, but should be defined by not only the claims, but equivalents thereof.

It should be appreciated that various embodiments of the disclosure and the terms used therein are not intended to limit the technological features set forth herein to particular embodiments and include various changes, equivalents, and/or replacements for a corresponding embodiment. With regard to the description of the drawings, similar reference numerals may be used to refer to similar elements. It is to be understood that a singular form of a noun corresponding to an item may include one or more of the things, unless the relevant context clearly indicates otherwise. As used in the disclosure, each of such phrases as "A or B," "at least one of A and/or B," "A, B, or C," or "at least one of A, B, and/or C" may include all possible combinations of the items enumerated together. Such terms as "1$^{st}$," "2nd," "first," or "second" may be used to simply distinguish a corresponding component from another, and does not limit the components in other aspect (e.g., order or importance). If it is described that if an element (e.g., a first element) is referred to, with or without the term "operatively" or "communicatively", as "connected to," or "coupled to" another element (e.g., a second element), it means that the element may be connected to the other element directly, or via another element (e.g., third element).

As used in the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, the module may be implemented in a form of an application-specific integrated circuit (ASIC).

Various embodiments of the disclosure may be implemented as software (e.g., program) including instructions stored in a machine-readable storage medium (e.g., internal memory or external memory) that is readable by a machine (e.g., computer). The machine is a device which calls stored instructions from the storage media and which is operable in accordance with the called instructions, and may include an auxiliary base station or terminal according to various embodiments. In case that the instructions are executed by a processor (e.g., controller 1310 or 1410 in the device drawing), the processor may perform functions corresponding to the instructions directly or using other elements that are under the control of the processor. The instructions may include a code generated or executed by a complier or an interpreter.

The machine-readable storage medium may be provided in the form of a non-transitory storage medium. Here, the term "non-transitory" simply means that the storage medium is a tangible device, and does not include a signal, but this term does not differentiate between data semi-permanently stored in the storage medium and temporarily stored in the storage medium.

A method according to various embodiments disclosed in the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed online via an application store (e.g., Play Store™). In case of online distribution, at least a part of the computer program product may be temporarily generated or at least temporarily stored in the machine-readable storage medium, such as memory of a manufacturer's server, a server of an application store, or a relay server.

According to various embodiments, each component (e.g., module or program) may include a single entity or multiple entities. According to various embodiments, parts of the above-described sub-components may be omitted, or other components may be further included. Alternatively or additionally, some components (e.g., modules or programs) may be integrated into a single entity, and the integrated single entity may still perform functions of the plurality of components in the same or similar manner as they are performed before the integration. According to various embodiments, operations performed by the module, the program, or another component may be carried out sequentially, in parallel, repeatedly, or heuristically, or at least partial operations may be executed in a different order or omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of a terminal for a multi power headroom report (PHR) in a wireless communication system supporting uplink carrier aggregation, the method comprising:
   receiving, from a base station, PHR configuration information including multi PHR type information;
   determining an indicator indicating whether a predefined transmission format is used in case of generating power headroom (PH) information on each of a plurality of serving cells based on the multi PHR type information;
   generating multi PH information on the plurality of serving cells based on the indicator; and
   transmitting, to the base station, the multi PH information,
   wherein the multi PHR type information is information indicating a first type multi medium access control (MAC) control element (CE) format or a second type multi MAC CE format.

2. The method of claim 1,
   wherein the indicator is a one-bit indicator corresponding to a serving cell of the plurality of serving cells, and
   wherein a virtual PH of the serving cell is generated based on the predefined transmission format in case that a value of the indicator is 1, and the virtual PH of the serving cell is generated based on a value used in transmitting an uplink to the serving cell in case that the value of the indicator is 0.

3. The method of claim 2,
   wherein the value of the indicator is configured based on whether the uplink for the serving cell is transmitted in case that the multi PHR type information indicates the first type multi MAC CE format, and wherein the value of the indicator is configured as a predefined value in case that the multi PHR type information indicates the second type multi MAC CE format.

4. The method of claim 3, further comprising:
identifying whether the uplink of the terminal for the serving cell is transmitted in case that the multi PHR type information indicates the first type multi MAC CE format,
wherein the value of the indicator is configured to 0 in case that there is an uplink transmission for the serving cell, and the value of the indicator is configured to 1 in case that there is not the uplink transmission.

5. The method of claim 3, wherein values of a plurality of indicators corresponding to the plurality of serving cells are configured to 1 in all in case that the multi PHR type information indicates the second type multi MAC CE format.

6. The method of claim 1, wherein the predefined transmission format assumes an uplink transmission of a predefined unit resource block regardless of whether an uplink for a serving cell of the terminal is actually transmitted.

7. The method of claim 1, further comprising:
transmitting, to the base station, a terminal capability message including information indicating whether a virtual multi PHR is supported.

8. The method of claim 1, further comprising:
receiving, from the terminal, a terminal capability message including information indicating whether a virtual multi PHR is supported.

9. A method of a base station for receiving multi power headroom (PH) information in a wireless communication system supporting uplink carrier aggregation, the method comprising:
transmitting, to a terminal, PHR configuration information including multi PHR type information;
receiving, from the terminal, the multi PH information corresponding to a plurality of serving cells; and
performing uplink scheduling based on the received multi PH information,
wherein the multi PHR type information is information indicating a first type multi medium access control (MAC) control element (CE) format or a second type multi MAC CE format, an indicator indicating whether a predefined transmission format is used is determined in case that the terminal generates the multi power headroom (PH) information on each of the plurality of serving cells based on the multi PHR type information, and the multi PH information is generated based on the determined indicator.

10. The method of claim 9,
wherein the indicator is a one-bit indicator corresponding to a serving cell of the plurality of serving cells, and
wherein a virtual PH of the serving cell is generated based on the predefined transmission format in case that a value of the indicator is 1, and the virtual PH of the serving cell is generated based on a value used in transmitting an uplink to the serving cell in case that the value of the indicator is 0.

11. The method of claim 10,
wherein the value of the indicator is configured based on whether the uplink for the serving cell is transmitted in case that the multi PHR type information indicates the first type multi MAC CE format, and wherein the value of the indicator is configured to a predefined value in case that the multi PHR type information indicates the second type multi MAC CE format.

12. The method of claim 11, wherein in case that the multi PHR type information indicates the first type multi MAC CE format, the terminal configures the value of the indicator to 0 in case that there is an uplink transmission to the serving cell, and the terminal configures the value of the indicator to 1 in case that there is not the uplink transmission.

13. The method of claim 11, wherein values of a plurality of indicators corresponding to the plurality of serving cells are configured to 1 in all in case that the multi PHR type information indicates the second type multi MAC CE format.

14. The method of claim 9, wherein the predefined transmission format assumes an uplink transmission of a predefined unit resource block regardless of whether an uplink for a serving cell of the terminal is actually transmitted.

15. A multi power headroom report (PHR) device in a wireless communication system supporting uplink carrier aggregation, the multi PHR device comprising:
a transceiver configured to communicate with a base station; and
a controller connected to the transceiver,
wherein the controller is configured to:
control the transceiver to receive, from the base station, PHR configuration information including multi PHR type information,
determine an indicator indicating whether a predefined transmission format is used in case of generating power headroom (PH) information on each of a plurality of serving cells based on the multi PHR type information,
generate multi PH information on the plurality of serving cells based on the indicator, and
control the transceiver to transmit the multi PH information to the base station, and
wherein the multi PHR type information is information indicating a first type multi medium access control (MAC) control element (CE) format or a second type multi MAC CE format.

16. The multi PHR device of claim 15,
wherein the indicator is a one-bit indicator corresponding to a serving cell of the plurality of serving cells, and
wherein a virtual PH of the serving cell is generated based on the predefined transmission format in case that a value of the indicator is 1, and the virtual PH of the serving cell is generated based on a value used in transmitting an uplink to the serving cell in case that the value of the indicator is 0.

17. The multi PHR device of claim 16,
wherein the value of the indicator is configured based on whether the uplink for the serving cell is transmitted in case that the multi PHR type information indicates the first type multi MAC CE format, and
wherein the value of the indicator is configured as a predefined value in case that the multi PHR type information indicates the second type multi MAC CE format.

18. The multi PHR device of claim 15, wherein the controller is configured to control the transceiver to transmit a terminal capability message including information indicating whether a virtual multi PHR is supported to the base station.

19. An apparatus for receiving multi power headroom (PH) information in a wireless communication system supporting uplink carrier aggregation, the apparatus comprising:
- a transceiver configured to communicate with a terminal; and
- a controller connected to the transceiver,
- wherein the controller is configured to:
  - control the transceiver to transmit, to a terminal, power headroom report (PHR) configuration information including multi PHR type information and to receive, from the terminal, the multi PH information corresponding to a plurality of serving cells, and
  - control to perform uplink scheduling based on the received multi PH information, and
- wherein the multi PHR type information is information indicating a first type multi medium access control (MAC) control element (CE) format or a second type multi MAC CE format, an indicator indicating whether a predefined transmission format is used is determined in case that the terminal generates the multi power headroom (PH) information on each of the plurality of serving cells based on the multi PHR type information, and the multi PH information is generated based on the determined indicator.

20. The apparatus of claim 19,
- wherein a value of the indicator is configured based on whether the uplink for a serving cell of the plurality of serving cells is transmitted in case that the multi PHR type information indicates the first type multi MAC CE format, and
- wherein the value of the indicator is configured as a predefined value in case that the multi PHR type information indicates the second type multi MAC CE format.

* * * * *